(12) United States Patent
Woodward et al.

(10) Patent No.: US 12,250,300 B2
(45) Date of Patent: Mar. 11, 2025

(54) AUTHENTICATION METHOD AND SYSTEM, A QUANTUM COMMUNICATION NETWORK, AND A NODE FOR QUANTUM COMMUNICATION

(71) Applicant: Kabushiki Kaisha Toshiba, Tokyo (JP)

(72) Inventors: Robert Ian Woodward, Cambridge (GB); Benjamin Marsh, Cambridge (GB); Joseph Dolphin, Cambridge (GB); James F. Dynes, Cambridge (GB); Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 294 days.

(21) Appl. No.: 17/886,528

(22) Filed: Aug. 12, 2022

(65) Prior Publication Data
US 2023/0275752 A1      Aug. 31, 2023

(30) Foreign Application Priority Data
Feb. 25, 2022   (GB) ..................................... 2202652

(51) Int. Cl.
H04L 29/06   (2006.01)
H04L 9/08    (2006.01)
H04L 9/32    (2006.01)

(52) U.S. Cl.
CPC .......... H04L 9/0852 (2013.01); H04L 9/3228 (2013.01); H04L 9/3242 (2013.01)

(58) Field of Classification Search
CPC ... H04L 9/0852; H04L 9/3228; H04L 9/3242; H04L 63/12; H04L 63/123; H04L 9/06;
(Continued)

(56) References Cited

U.S. PATENT DOCUMENTS 7,457,416 B1    11/2008   Elliott
2003/0028672 A1   2/2003   Goldstein
(Continued)

FOREIGN PATENT DOCUMENTS

CN   11 4065249 A    2/2022
GB      2581528 A    8/2020
(Continued)

OTHER PUBLICATIONS

Office Action issued Oct. 31, 2023, in corresponding Japanese Patent Application No. 2022-136134 (with English Translation), 12 pages.
(Continued)

*Primary Examiner* — Malcolm Cribbs
(74) *Attorney, Agent, or Firm* — Oblon, McClelland, Maier & Neustadt, L.L.P.

(57) ABSTRACT

An authentication method for quantum communication between two nodes, the method comprising:
  applying a hash function to a message to obtain a hash code, wherein the hash function is a Poly1305;
  applying a one-time pad cipher to the hash code to obtain a message authentication code (MAC); and
  authenticating the message exchanged between the two nodes using the MAC.

18 Claims, 11 Drawing Sheets

(58) Field of Classification Search
CPC ... H04L 9/0643; H04L 9/3236; H04L 9/3239; G06F 21/64

See application file for complete search history.

(56) References Cited

U.S. PATENT DOCUMENTS

| | | | |
|---|---|---|---|
| 2009/0316910 A1 | 12/2009 | Maeda et al. | |
| 2013/0101121 A1 | 4/2013 | Nordholt et al. | |
| 2013/0251145 A1* | 9/2013 | Lowans | H04L 9/0891 |
| | | | 380/44 |
| 2014/0310530 A1 | 10/2014 | Oguma et al. | |
| 2018/0084412 A1* | 3/2018 | Alfred | H04W 12/0431 |
| 2020/0274701 A1* | 8/2020 | Yuan | H04L 9/0841 |
| 2022/0294616 A1* | 9/2022 | Parry | H04L 9/0855 |
| 2023/0113906 A1* | 4/2023 | Montaner | H04L 9/3242 |
| | | | 711/163 |

FOREIGN PATENT DOCUMENTS

| | | |
|---|---|---|
| JP | 2003-196244 A | 7/2003 |
| JP | 2008-306633 A | 12/2008 |
| JP | 2013-098719 A | 5/2013 |
| JP | 2013-539324 A | 10/2013 |
| WO | WO 2015/048783 A1 | 4/2015 |

OTHER PUBLICATIONS

United Kingdom Combined Search Report and Examination Report issued Aug. 23, 2022 in GB Patent Application No. 2202652.0, 6 pages.

Abidin, "On Security of Universal Hash Function Based Multiple Authentication", Information and Communications Security: 14th International Conference ICICS 2012, Springer, 2012, pp. 303-310.

Internet Research Task Force, Y Nir and A Langley, "Request for Comments: 8439. ChaCha20 and Poly1305 for IETF Protocols", Jun. 2018, pp. 1-46.

Delignat-Lavaud et al., "Implementing and Proving the TLS 1.3 Record Layer", 2017 IEEE Symposium on Security and Privacy, IEEE, 2017, pp. 463-482.

Peev et al., "The SECOQC quantum key distribution network in Vienna", New J. Phys. 11, 075001, 2009, 38 pages.

Wang et al., "Experimental Authentication of Quantum Key Distribution with Post-quantum Cryptography", npj: Quantum Information, 7 pages, 2021, arXiv:2009.04662.

Constantin et al., "An FPGA Based 4 Mbps Secret Key Distillation Engine for Quantum Key Distribution Systems", J Sign Process Syst 86, 2017, 15 pages.

Cui et al., "An authentication scheme with high throughput based on FPGA for a practical QKD system", Optik 126, 2015, pp. 4747-4750.

Wegman et al., "New hash functions and their use in authentication and set equality", Journal of Computer and System Sciences 22, 1981, pp. 265-279.

Shoup, "On Fast and Provably Secure Message Authentication Based on Universal Hashing", Advances in Cryptology—CRYPTO'96, Lecture Notes in Computer Science 1109, Dec. 1996, 12 pages.

Bernstein, "The Poly1305—AES Message-Authentication Code", Lecture Notes in Computer Science, vol. 3557, 2005, 18 pages.

Portmann, "Key recycling in authentication", IEEE Transactions on Information Theory, 60(7), 2014, 20 pages.

Carter et al., "Universal classes of hash functions" Journal of computer and system sciences, 18(2), 1979, pp. 143-154.

Dynes et al., "Cambridge quantum network", npj: Quantum Information, 5(1), 2019, 8 pages.

Needham et al., "Using encryption for authentication in large networks of computers", Communications of the ACM, 21(12), Dec. 1978, pp. 993-999.

Extended European Search Report issued May 15, 2023 in European Patent Application No. 22190003.8, 7 pages.

Bibak et al., "Quantum Key Distribution with PRF (Hash, Nonce) achieves everlasting security", Quantum Information Processing, vol. 20, No. 7, Jul. 1, 2021, pp. 1-18, XP 037528280.

Fujiwara et al., "High Secure Network Switch with Quantum Key Distribution System", 2013 Conference on Lasers and Electro-Optics Pacific Rim (CLEO-PR), Jun. 30, 2023, pp. 1-2, XP032481634.

Pacher et al., "Attacks on quantum key distribution protocols that employ non-ITS authentication", Quantum Information Processing, vol. 15, No. 1, Nov. 13, 2015, pp. 327-362, XP 035593389.

Office Action issued Oct. 31, 2023, in Japanese Patent Application No. 2022-136105, with English-language Translation.

Bibak, K. et al., "Authentication of Variable Length Messages in Quantum Key Distribution", EPJ Quantum Technology, 2022, 9:8, pp. 1-20.

Karonen, et al., "Is Poly1305 an Information—Theoretically Secure MAC", Cryptography Stack Exchange, [online], 2020, pp. 2-6.

DI Management, Poly135 Authenticator, Published Jan. 28, 2015, pp. 2-4.

* cited by examiner

Fig. 9A

Original Frame Structure (e.g. Ethernet Frame)

| Byte # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | etc |
|---|---|---|---|---|---|---|---|---|---|---|---|---|---|---|---|---|---|---|---|---|---|---|---|---|---|---|---|---|---|---|---|---|
| Purpose | Destination Address | | | | | | Source Address | | | | | | Type | | | | Data Payload | | | | | | | | | | | | | | |

Fig. 9B

Our Modified Frame Structure (including custom label for counting which replica the frame contains)

| Byte # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | etc |
|---|---|---|---|---|---|---|---|---|---|---|---|---|---|---|---|---|---|---|---|---|---|---|---|---|---|---|---|---|---|---|---|---|
| Purpose | Destination Address | | | | | | Source Address | | | | | | Custom Labelling | | | | Type | | Data Payload | | | | | | | | | | | | |

AUTHENTICATION METHOD AND SYSTEM, A QUANTUM COMMUNICATION NETWORK, AND A NODE FOR QUANTUM COMMUNICATION

CROSS REFERENCE

This application claims priority from GB application number: 2202652.0 which is hereby incorporated by reference.

FIELD

Embodiments herein relate generally to an authentication method and a system for quantum communication, a quantum communication network, and a node for quantum communication.

BACKGROUND

The exchange of cryptographic keys between two parties underpins the security of modern communication infrastructure. To guarantee the security of the communication infrastructure, the secrecy of the cryptographic keys must be maintained. The secrecy of the cryptographic keys is threatened by attacks by adversaries having access to advanced computing systems, including quantum computers, which may solve particular mathematical problems efficiently.

A quantum communication network may be used to share secret cryptographic keys between two nodes, a source node and a destination node, often referred to as "Alice" and "Bob", and this technique is known as quantum key distribution (QKD). In a quantum communication network, information is sent between a transmitter and a receiver by encoded single quanta, such as single photons. Each photon carries one bit of information encoded upon a property of the photon, such as its polarization, phase or energy/time. The photon may even carry more than one bit of information, for example, by using properties such as angular momentum.

The attraction of QKD is that it provides a test of whether any part of the key can be known to an unauthorized eavesdropper "Eve". In many forms of QKD, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

QKD comprises a discussion between the two nodes Alice and Bob over a classical channel.

BRIEF DESCRIPTION OF THE FIGURES

Systems and methods in accordance with non-limiting examples will now be described with reference to the accompanying figures in which:

FIG. 9A shows a schematic illustration of a frame structure for data and/or authentication frames;

FIG. 9B shows a schematic illustration of a frame structure for data and/or authentication frames comprising a custom label;

DETAILED DESCRIPTION

Figure 1:
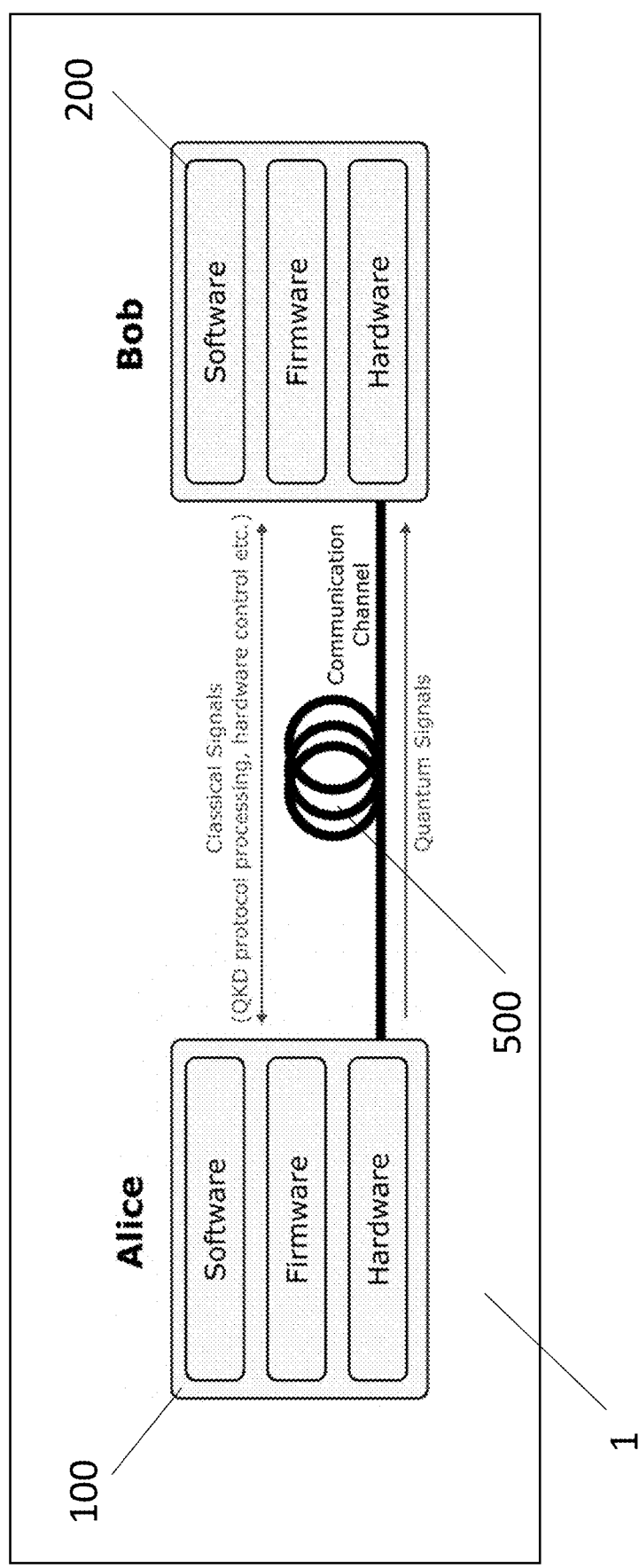
FIG. 1 shows a schematic illustration of a quantum communication network.

According to a first aspect, there is provided an authentication method for quantum communication between two nodes. The method comprises:

applying a hash function to a message to obtain a hash code, wherein the hash function is a Poly1305;

applying a one-time pad cipher to the hash code to obtain a message authentication code (MAC); and authenticating the message exchanged between the two nodes using the MAC.

Poly1305 is a polynomial evaluation function.

Poly1305 function comprises:

$$(c_1 r^q + c_2 r^{q-1} + \ldots + c_q r^1) \bmod 2^{130}-5,$$

Wherein $c_1, c_2, \ldots, c_q$, are integers that are derived from blocks of the message, and r represents a key.

Quantum communication comprises the exchange of information over a quantum channel, followed by a discussion between the two nodes over an authenticated (but public) classical channel. The purpose of the authentication is to verify that the messages received via the classical channel are in fact from the two nodes, rather than from an attacker. Therefore, authenticating the classical channel ensures that the discussion is secure, thereby improving the security of quantum communication.

Further, the method ensures the integrity of a message exchanged between the two nodes by ensuring that the message not only came from the intended person, but that it hasn't been tampered with en-route.

The disclosed method enables the authentication of the classical channel for quantum communication. The disclosed method provides improved security compared to prior art methods. In particular, the authentication method is information-theoretic secure (ITS) —which means that the security is derived from information theory. Further, the disclosed authentication method is practical in that it does not require overly long keys, it does not have a high computational load, and it maintains the performance of the quantum communication protocol.

Applying a polynomial evaluation hash function (such as, the Poly1305 function) enables plain text messages to be converted to a hash code. The hash function takes as input a plain text message of variable length and outputs a hash code having a fixed length. By having a fixed length hash code, the subsequent step of applying a cipher may be simplified (e.g., the length of the key may be reduced). Furthermore, the polynomial evaluation hash function may be evaluated efficiently (since it may use only addition, multiplication or modulus operations). This is also referred to as Homer's method. In addition, the polynomial evaluation hash function may be evaluated on-the-fly (that is, without having to wait for the receipt of an entire plain text message).

Applying a cipher to the hash code to obtain a MAC code further improves the security by preventing an attack known as chosen-plain text attacks (which would allow an attacker to gain information about the message-to-MAC code mapping). In particular, applying a one-time pad (OTP) cipher to the hash code renders the authentication method ITS, since the OTP cipher is ITS.

In the disclosed method, the combination of a polynomial evaluation hash function (such as the Poly1305 function) with an OTP cipher enables ITS authentication, and enables complete ITS quantum communication, while being practical to implement. In classical cryptography, OTP is problematic to implement, since it requires shared symmetric keys between the two nodes. In classical cryptography, a finite amount of shared symmetric keys is available, and, thus, OTP would not be practical. The inventors of the present application have developed an authentication method for quantum communication whereby the limitations of classical cryptography are overcome by combining the Poly1305 hash function with the OTP cipher. The inventors have exploited the fact that, in a quantum communication protocol, new shared symmetric keys are continually being generated between the two nodes. There is no ITS classical cryptographic primitive that can achieve this.

In an embodiment, the two nodes are connected via a quantum communication channel, wherein information is encoded on weak light pulses; and wherein the two nodes are connected via a classical communication channel, wherein the message is exchanged via the classical communication channel.

In an embodiment, the hash function is applied using a first key; the one-time pad cipher is applied using a second key; and each of the first key and the second key is a secret key that is shared between the two nodes.

In an embodiment, the hash function is applicable to a message of any length and the hash function is configured to produce a fixed length hash code. The advantage of a fixed length hash code is that a fixed length second key may be used for applying the OTP cipher. Thus, the authentication method is rendered practical. A fixed length hash tag is also beneficial as it simplifies processing—since for any length of message, the hash length is the same.

In an example, the hash code is 128-bit long. The second key can therefore be 128-bit long. A 128-bit key is considered a short key length that is practical. Therefore, the authentication method is rendered practical.

In an embodiment, applying the hash function comprises: processing each block of the message, wherein the message comprises a plurality of blocks; accumulating the result of the processing for each block in an accumulator; and deriving the hash code from the accumulator. The advantage is that the blocks may be processed as they arrive, rather than caching the blocks and until the entire message is received.

For example, each block can be processed (and the accumulator updated) as they arrive, so that there is no need for a delay or for waiting for the whole message.

In an example, authenticating the message comprises:
transmitting the message and the MAC;
determining a further MAC from the received message, wherein determining the further MAC comprises:
obtaining a further hash code by applying the hash function to the received message using the first key; and
applying a one-time pad cipher to the further hash code using the second key to obtain a further MAC; and,
comparing the further MAC with the received MAC, such that the message is authenticated when the further MAC corresponds to the received MAC.

In an embodiment, authenticating the message comprises:
Transmitting an authentication frame interleaved with a data frame,
wherein the authentication frame comprises the MAC, and
wherein the data frame comprises the message.

In an embodiment, authenticating the message further comprises:
Transmitting a subsequent authentication frame interleaved with a subsequent data frame, the subsequent authentication frame comprising a subsequent MAC, wherein the subsequent MAC is used to authenticate the subsequent data frame and the authentication frame. This enables that the entire data stream can be authenticated, including the MACs themselves.

In an embodiment, authenticating the message further comprises:
transmitting a replica of the authentication and data frame, wherein, responsive to the authentication and data frame failing authentication, the replica of the authentication and data frame is authenticated. Losses in the communication channel may result in errors in the signal measured at the receiver. When the errors cause the received messages and/or MAC not to match, the authentication and data frames may fail authentication. Rather than using acknowledgements or re-sending of data, which can introduce latency and delays and lower the quantum communication performance, the disclosed method transmits a replica to provide redundancy and reduce the probability that authentication fails due to losses in the communication channel.

In an embodiment the replica of the authentication and data frames each comprise a label indicating that said frame is a replica.

In an example, the one-time pad cipher comprises an exclusive OR function.

In an example, the second key is unique, random, and at least as long as the hash code.

In an embodiment, the first key is unique. When the first key is re-used, the security may be weakened. Therefore, by not re-using the first key (that is, the first key is unique), the security is improved.

In an embodiment, the first key and/or the second key are exchanged using quantum key distribution (QKD). Generating the second key using a QKD protocol ensures that the second key is secret, and ensures that the authentication method is ITS. Furthermore, by using the disclosed hash function, the disclosed method does not require overly long keys and the second key uses a small portion of the keys generated by the QKD protocol. Therefore, the authentication method is practical.

According to a second aspect, there is provided a method for quantum communication between two nodes, the method comprising:

exchanging a QKD key on a quantum communication channel, wherein information exchanged on the quantum communication channel is encoded on weak light pulses;

exchanging a message on a classical communication channel; and authenticating the exchanged message, wherein authenticating the exchanged message comprises:
  applying a hash function to the message to obtain a hash code, wherein the hash function is a polynomial evaluation function, and wherein
    applying the hash function comprises:
      processing each block of the message, wherein the message comprises a plurality of blocks, accumulating each processed block in an accumulator, and deriving the hash code from the accumulator;
  applying a one-time pad cipher to the hash code to obtain a message authentication code (MAC); and
  authenticating the message exchanged between the two nodes using the MAC.

The advantage of the above method is that on-the-fly authentication is enabled. During quantum communication, the classical channel may be authenticated at regular intervals. With more frequent authentication events, the practical security is improved (since a potential man in the middle (MITM) attack can be detected sooner). However, having frequent authentication events may slow down the quantum communication, especially if each authentication event requires waiting for a large message to be cached, and uses more key material. By processing each block of the message, on-the-fly (real time) authentication is enabled. Consequently, the disclosed method also provides improved security (by allowing frequent authentication events), without impacting the performance of the quantum communication (since, for example, it is not required to wait for a large message to be cached).

Note that even with irregular authentication (i.e. with relatively long time intervals between authentication events), the communications may be secure provided some mechanism is in place to not use the generated keys from some batch of classical communications until the batch is authenticated. Regular authentication provides the advantage of having shorter intervals between knowing when the next batch of keys can be used.

The method enables variable length messages to be authenticated since the size of the message is not fixed by a hardware buffer. Further, the time interval at which authentication is performed may be varied. Additionally, the method is flexible. The method permits arbitrary time periods for authentication (e.g. every few secs, minutes or even hours). For example, by performing authentications less frequently, less key material is required.

For example, the polynomial evaluation function is Poly1305.

The one-time pad cipher may be based on a QKD key exchanged on the quantum communication channel.

In an embodiment, the method comprises:
  Deriving a result from the exchanged message;
  Authenticating the message using the method according to the second aspect; and
  Responsive to the message being authenticated, indicating that the result is useable.

The message can be processed as it arrives. The authentication is performed afterwards. This enables real-time processing. For example, a result may be derived from the exchanged message without waiting for the message to be authenticated. The derived result may correspond to a key for QKD, for example. QKD keys may therefore be derived as the messages arrive. Keys (results) that are indicated as being authenticated may be used, while keys (results) that are not indicated to be authenticated may not be used. The advantage is that a performance penalty associated with having to store a large number of exchanged messages and then processing said messages in one batch is avoided. Security is retained since when, the MAC tag does arrive, and authentication is performed, any keys that are not indicated as authenticated may be discarded. The method is flexible since it is not limited by the size of available storage buffer.

In an embodiment, indicating that the result is authenticated comprises:
  Labelling the result as unauthenticated and then removing the label after authentication; or
  Labelling the result as authenticated after authentication.

In an embodiment, the message comprises at least one of: quantum key distribution (QKD) protocol information; a quantum key distribution hardware control signal; and an application message.

For example, QKD protocol information comprises messages relating to QKD post-processing stages including sifting, error correction and privacy amplification. By using the authentication methods described herein to exchange QKD protocol information, the security of the QKD system is improved.

In an embodiment, the hash function is applied using a first key;
  the one-time pad cipher is applied using a second key; and
  each of the first key and the second key is a secret key that is shared between the two nodes.

In an example, authenticating the exchanged message comprises:
  transmitting the message and the obtained MAC;
  determining a further MAC from the received message, wherein determining the further MAC comprises:
    obtaining a further hash code by applying the hash function to the received message using the first key; and
    applying a one-time pad cipher to the further hash code using the second key to obtain a further MAC; and,
    comparing the further MAC with the received MAC, such that the message is authenticated when the further MAC corresponds to the received MAC According to a further aspect, there is provided a quantum communication network for communication between two nodes comprising:
  a quantum communication channel that connects the two nodes, wherein information in the channel is encoded on weak light pulses; and
  a classical communication channel that connect the two nodes, wherein
  the classical communication channel is authenticated using the authentication method disclosed herein.

According to a further aspect, there is provided a node for quantum communication, the node comprising:
  A quantum key distribution system; and a
  An authentication engine,
  Wherein the authentication engine is configured to perform any of the method herein.

According to a further aspect, there is provided a node for quantum communication, the node comprising:
  A quantum key distribution system; and a
  An authentication engine,
  Wherein the authentication engine is configured to:
  Receive a message and a MAC;

determine a further MAC from the received message, wherein determining the further MAC comprises:
obtaining a further hash code by applying a hash function to the received message using a first key, wherein the hash function is a Poly1305; and
applying a one-time pad cipher to the further hash code using a second key to obtain a further MAC; and,
compare the further MAC with the received MAC, such that the message is authenticated when the further MAC corresponds to the received MAC.

In an example, the authentication engine is operable on an application-specific integrated circuit (ASIC) hardware or field-programmable gate array (FPGA) hardware.

In an example, the authentication engine comprises a computer program executed by a processor.

In an example, the authentication engine is implemented as both a computer program executed by a processor, and on an application-specific integrated circuit (ASIC) hardware or field-programmable gate array (FPGA) hardware.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium. In an example, there is a carrier medium comprising computer readable code configured to cause a computer to perform any of the above described methods.

FIG. 1 shows a schematic illustration of a quantum communication network 1. The network 1 comprises two nodes, Alice 100 and Bob 200, that are connected via a communication channel 500. The communication channel 500 is fibre optic based, free-space based, or based on a combination of fibre optic or free-space.

A fibre optic based communication channel comprises the transmission of information (e.g. by way of pulses of light) through an optical fiber.

A free-space based communication channel comprises the transmission of information in air, outer space, or vacuum for example. Information may be in the form of light (e.g. optical pulses).

A channel that is based on a combination of fibre optic or free-space may comprise transmission through an optical fiber for a part of the channel, and transmission through free-space for another part of the channel.

Alice 100 and Bob 200 each comprise a QKD system that comprises software, firmware and hardware layers. The functions of the different layers will be described in more detail further below in relation to FIG. 10. Briefly, the software layer may implement a quantum communication protocol (e.g. BB84); the firmware layer is software that allows control of the hardware layer in accordance with the software layer and the hardware layer comprise a processor or other hardware for executing the software; and the electronics and optics for quantum and classical communication.

For example, the hardware component is configured to encode information using light that is suitable for transmission over communication channel 500.

As shown in FIG. 1, the hardware at Alice 100 comprises a quantum communication unit while the hardware at Bob 200 comprises another quantum communication unit. The quantum communication units at Alice 100 and Bob 200 enable the transfer of quantum information from Alice to Bob.

For example, the quantum communication unit at Alice 100 may be configured to transmit while the quantum communication unit at Bob 200 may be configured to receive. Note that, alternatively, the quantum communication unit at Alice 100 may be configured to receive while the quantum communication unit at Bob 200 may be configured to transmit. Yet alternatively, the quantum communication units at Alice and Bob are each configured to transmit and receive.

Although FIG. 1 shows that the hardware layer is located at the nodes Alice or Bob, it will be understood that, alternatively, at least some the components of the hardware layer may be located at a location separate from Alice or Bob. For example, some of the optics may not located be located the nodes. For example, the light source may not be located at the nodes. The light source may be coupled to the node.

Alice 100 and Bob 200 also comprise a classical communication interface. The classical communication interface enables each of Alice 100 and Bob 200 to transmit and receive classical information.

As shown in FIG. 1, Alice 100 and Bob 200 are connected via a communication channel 500. The communication channel 500 is used exchange both quantum and classical signals. For example, wavelength division multiplexing is used to combine the quantum and classical signals for transmission through communication channel 500.

Alternatively, the classical signals and the quantum signals are sent through separate communication channels. For example, the classical signal may be sent through a channel such as the internet.

How a quantum communication channel may be realised is described further below in relation to FIG. 11.

The quantum communication network 1 of FIG. 1 is used for sharing secret keys between the two nodes (Alice and Bob). This technique is also referred to as quantum key distribution (QKD). QKD is a technique for generating perfectly random quantum keys at two remote nodes. The keys are secret and shared between the two remote nodes. This enables users at these nodes (referred to herein as Alice and Bob) to utilise the symmetric keys for data encryption to ensure secure communications. By symmetric keys, it is meant that the same key is used for encryption and decryption. By random, it is meant that it cannot be reasonably predicted better than by chance. A random key may have the same chance of being predicted as another random key. The keys used for encryption and decryption may be identical, or may be related by a transformation. Once exchanged via QKD, the shared secret keys can be used for encrypting data using an encryption algorithm. The encrypted data may be transmitted using conventional communication means. For example, keys could be used to encrypt messages using the one-time pad (OTP) cipher, which can result in information-theoretically secure (ITS) communication, where the security of the system is derived from information theory, with no unproven assumptions about the limited computational power of an eavesdropper.

QKD operates as follows. Quantum states are encoded at a first node (Alice 100 as shown in FIG. 1), transmitted as a quantum signal via communication channel 500, and measured at second node (Bob 200 as shown in FIG. 1). This is followed by a discussion between the two nodes over an authenticated (but public) classical channel. This discussion enables Alice and Bob to detect the presence of an eavesdropper. For example, in the discussion, Alice & Bob share the random bases they chose for each bit, as part of the 'sifting' step. A more detailed explanation of a QKD protocol is described below. An example of a QKD protocol, known as the BB84 protocol, is described below in relation to FIG. 11.

Together with the classical communication messages associated with the QKD protocol itself, additional classical communication signals may be sent between the nodes for hardware control and for ensuring synchronisation between the optical and electronic equipment.

Having an authenticated classical communication channel ensures that the generation of keys between the nodes remains secure. Authenticating the classical communication channel means that the users can verify the classical messages they receive were sent by the other party and not tampered with in transit, ensuring the integrity and authenticity of these messages. This avoids a man-in-the-middle (MITM) attack, whereby an attacker could spoof one user's identity and trick the other into sharing information with them (this would be a threat to both the QKD protocol, as well as opening up side channels that allow an attacker to send messages which affect the operation of the hardware).

Authentication can form a part of overall QKD system security. In a QKD-based cryptosystem, the QKD cryptographic primitive may be built on top of other cryptographic primitives such as authentication schemes, and the strength and composability of these schemes define the security of the overall system. Since QKD can enable ITS secure communications, an ITS authentication scheme is required for the overall system to be ITS, i.e. for it to offer maximum security for users who utilise the generated symmetric quantum keys (e.g. for data encryption).

The classical communication channel may be authenticated using classical public key cryptography (such as RSA). However, this may be vulnerable to quantum computers, or more advanced cryptanalysis. Algorithms such as 'quantum resistant algorithms' (also known as post-quantum cryptography) could also be used for authenticating the classical channel. These are more advanced cryptographic tools for which efficient quantum computing techniques to break them are not yet known to exist. However, quantum resistant algorithms (QRAs) are not yet well established or 'battle tested'. For example, of the 69 accepted for consideration for certification by NIST in 2017, 30 have now been found to possess weaknesses or vulnerabilities. Further, QRAs are based on limitations of known quantum computing algorithms. There is no guarantee that more advanced cryptanalysis will be unable to break them. Thus, they are not an ITS solution.

Thus, neither public-key cryptography nor QRAs offer ITS security.

Authentication methods and systems that provide ITS security are described herein. The disclosed methods and systems are also practical. For example, they do not require overly long key length or high computational load. Hence, they do not impact upon QKD key generating performance.

Figure 2:
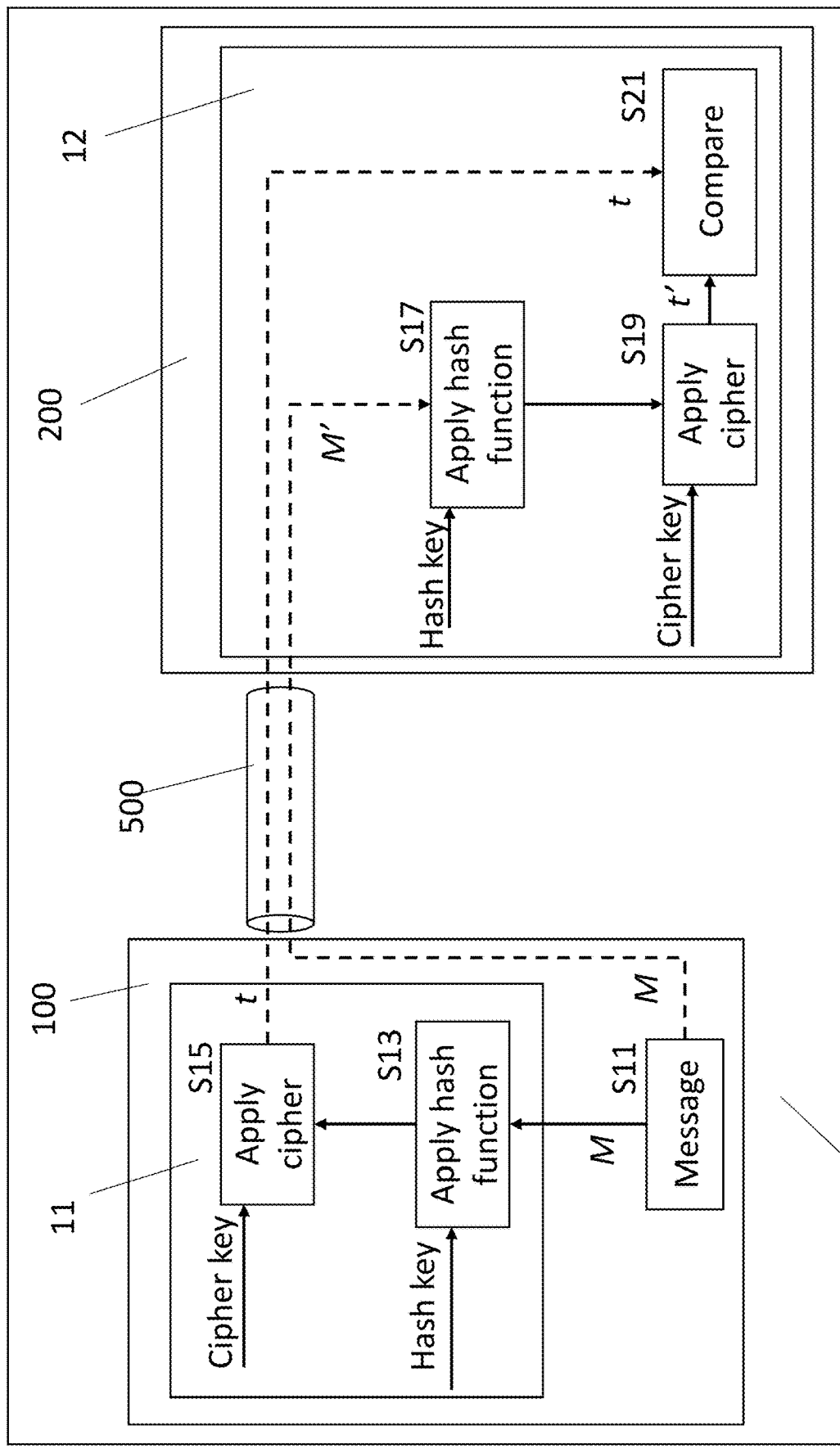
FIG. 2 shows a schematic illustration of an authentication system for quantum communication.

FIG. 2 is a schematic illustration of an authentication system 10 for quantum communication between two users Alice 100 and Bob 200, connected via the communication channel 500. The authentication system 10 relies on a technique referred to as Message Authentication Codes (MACs). A MAC is a piece of information used to authenticate a message.

To authenticate a message means to confirm that the message originates from the stated sender. A MAC also protects the integrity of the message by enabling detection of any changes to the message content.

The authentication system 10 comprises an authentication engine 11 at Alice 100 and an authentication engine 12 at Bob 200. Note that although not shown, Alice 100 and Bob 200 may also comprise a QKD system.

In FIG. 2 and for the purposes of the authentication system 10, communication channel 500 is considered as a classical communication channel.

An example of a MAC scheme for classical cryptography is described next.

A MAC scheme is a technique whereby a short piece of information (known as the MAC, or a 'tag', t) is computed for each message, M based on its content and a secret key, k:

$$t = f(M, k) \qquad (1)$$

where f is the MAC tag computation function (chosen to meet certain strict cryptographic requirements) and k is the secret symmetric key. This key is pre-shared between the two communicating users and not known to anyone else.

Alice 100 computes and sends a tag t along with each message during communication (note that this is sent in public along with the message M). When Bob 200 receives this, he also calculates a tag t' based on the message he received M' and the secret key k which Alice and Bob pre-shared:

$$t' = f(M', k) \qquad (2)$$

If the tags match (t=t'), Bob accepts the message since (for an appropriately designed MAC scheme) he can be sure that only Alice was able to compute t based on that message M and secret key k, confirming that M has not been tampered with during transit or spoofed (i.e. ensuring M=M'). If the tags do not match, the message is assumed fake and can be discarded.

MAC schemes may have varying levels of security and different assumptions made about the power of the eavesdropper. For ITS security, where no restrictions on computational power are placed on the eavesdropper, a MAC scheme generating tags of length |t| bits must result in the probability of an attacker successfully generating a valid tag for message M (in the absence knowing of the secret key) being negligible in |t|.

MAC schemes can offer ITS security when they are based on families of universal/almost universal hash functions combined with a cipher to encrypt the hashed output. Such MAC schemes are also referred to as Wegman-Carter MACs. Such schemes comprise two parts.

Firstly, a hash function is applied to the message M. The output of the hash function is referred to as a hash code, a hash value, a (message) digest or a hash. The hash function is configured to compress each message of length |M| bits into a tag of length |t| bits. For example, |t|<<|M| to avoid wasting communication bandwidth. The security of the hash function can be quantified by a security parameter $\epsilon$, which represents the probability of a collision. Mathematically, for any hash function h within the family of hash functions, the collision probability is defined as the chance that two different messages, M and M', result in the same hash, i.e.

$$Pr[h(M) = h(M')] = \epsilon \qquad (3)$$

Here, "Pr[·]" represents a probability.

If all hash functions within a family meet this criteria with $\epsilon = 2^{-|M|}$, the family is known as perfectly universal.

Even if this criteria is relaxed to the less restrictive:

$$Pr[h(M)=h(M')]\leq \epsilon \quad (4)$$

it is still possible to use the hash functions family to build a composable ITS-secure MAC. In this case, the hash functions are said to be belong to a family of $\epsilon$-almost-universal functions.

The $2^{nd}$ part of a secure MAC is the cipher which encrypts the hash output. This is required since the same hash function may be used for many rounds of tag generation, and thus the output must be encrypted to prevent chosen-plaintext attacks (i.e. which would allow an attacker to gain information about the message-to-tag mapping).

Returning to FIG. 2, an authentication system 10 for quantum communication between two users Alice 100 and Bob 200 will now be described.

At node Alice 100, the plaintext message, M, to be transmitted is obtained (S11). The plaintext message M is then fed into authentication engine 11.

A hash function is then applied to the message in step S13, to obtain a hash code. A cipher is then applied to the hash code in S15, to obtained a tag, t. The tag t, together with the plain text message M, is transmitted to Bob 200 via classical communication channel 500. At Bob, the received plain text message M' is fed into authentication engine 12. The message M' is hashed in step S17 to obtain a further hash code. The further hash code is then encrypted using a cipher in S19 to obtain a further tag, t'. The further tag t' is then compared to the received tag t. if the two tags correspond, the message is authenticated. If the two tags do not correspond, then the message is not authenticated. If the message is not authenticated, the message may be discarded, and/or an interrupt may be triggered.

The hash function and cipher used by Alice in S13 and S15 are the same as the hash function and cipher used by Bob in S17 and S19.

Further, the hash function uses a hash key, and the cipher uses a cipher key. The hash key and cipher key are secret keys that have been pre-shared between Alice and Bob.

Although FIG. 2 shows transmission of the message and the tag from Alice to Bob, Bob may similarly transmit a message and a tag to Alice (not shown).

The authentication engine 11 and 12 are implemented as described below, as described in relation to FIG. 10.

The hash function will be described next.

The hash function is a polynomial evaluation hash function. Poly1305 is an example of a polynomial hash function.

Poly1305-AES is a MAC, where Poly1305 is the hash function and advanced encryption standard (AES) is the cipher. The AES algorithm is a symmetric-key algorithm where the same key is used for encryption and decryption. AES is only computationally secure and not ITS. The security of the Poly1305-AES is corresponds to that of the underlying AES. Thus, Poly1305-AES is also only computationally secure and not ITS. Computationally secure means that it is not decodable within a reasonable time with available computational power. Computationally secure assumes a finite computational power is available. A computationally secure scheme is less secure than an ITS scheme.

Poly1305 is a polynomial evaluation hash function which performs the evaluation over a prime field (i.e. a Galois field) of order $2^{130}-5$, hence the name of the scheme. Note, however, that the size of the hash key space is $2^{106}$ rather than $2^{130}-5$ since messages are encoded before hashing. The Poly1305 MAC computes a 128-bit tag for a variable-length message M and requires a 256-bit key k. The key is subdivided into two 128-bit parts, r and s. The first r 128-bits are the hash key, which is the basis for the polynomial evaluation. The second s 128-bits are the cipher key. The tag is computed as follows:

$$t=(f(M,r)+s) \mod 2^{128} \quad (5)$$

where f(M,r) is a polynomial of r with coefficients derived from the bits in the message M.

The length of the tag is also 128 bits long.

To achieve security, a random key k is required for each round of the algorithm (i.e. for each message tag generated). In the Poly1305-AES MAC, $s=AES_g(n)$ where AES is the Advanced Encryption Standard algorithm, g is a 128-bit AES key and n is a 128-bit nonce. A nonce is an arbitrary number that is used once in cryptographic communication. AES is used here to effectively expand a short key into a longer key, permitting reuse of the shared secret key providing a different nonce is used for each message. An example of a nonce is a message counter. A message counter is easier to implement than needing a new shared secret each time. However, AES is only computationally secure, and not ITS.

How a hash code is obtained using the Poly1305 hash function, f(M, r), is described next.

A message M is represented by m[0], m[1], ..., m[l-1]. The length l, of the message M can be any nonnegative integer, and can vary from one message to another. A term q is set as l/16.

The hash key, r, is a 128-bit integer in unsigned little-endian form. In the little-endian system, the least-significant byte is stored at the smallest memory address, while the most-significant byte is stored at the largest memory address. The key, r, is a 16-byte string r[0], r[1], ..., r[15]. The hash key has the form: $r=r[0]+2^8 r[1]+ \ldots +2^{120} r[15]$. Certain bits of r are 0: r[3], r[7], r[11], r[15] have their top four bits being 0 (i.e., to be in $\{0, 1, \ldots, 15\}$), and r[4], r[8], r[12] are required to have their bottom two bits clear (i.e., to be in $\{0, 4, 8, \ldots, 252\}$). Thus, there are $2^{106}$ possibilities for r.

Integers $c_1, c_2, \ldots, c_q$, which are elements of $\{1, 2, 3, \ldots, 2^{129}\}$ are defined as follows:

If $1 \leq i \leq l/16$, then $$c_i = m[16i-16]+2^8 m[16i-15]+2^{16} m[16i-14]+ \ldots + 2^{120} m[16i-1]+2^{128};$$

if l is not a multiple of 16, then $$c_q = m[16q-16]+2^8 m[16q-15]+ \ldots +2^{8(l \mod 16)-8} m[l-1]+2^{8(l \mod 16)}.$$

In words, each 16-byte chunk of a message is padded to 17 bytes by appending a 1. If a final chunk las a length between 1 and 15 bytes, 1 is appended to the chunk and the chunk is zero padded to 17 bytes. The resulting padded 17-byte chunk is treated as an unsigned little-endian integer.

The hash code of a message M using the Poly1305 function is then the 16-byte unsigned little-endian representation of:

$$(c_1 r^q + c_2 r^{q-1} + \ldots + c_q r^1) \mod 2^{130}-5. \quad (6)$$

In equation (6), $c_1, c_2, \ldots c_q$, and $r^q, r^{q-1}, r^1$ are as defined above.

According to an example, the hash function comprises the Poly1305 such as that described in D. J. Bernstein, "The Poly1305-AES Message-Authentication Code", in Lecture Notes in Computer Science, vol. 3557. Springer, Berlin (2005). Poly1305 has been standardised by the Internet Engineering Task Force in document RFC8439 (2018).

Although the above describes the hash function f(M, r) as Poly1305, a polynomial evaluation hash function where evaluation is performed over a prime field of order $2^{130}-5$, other primes may also be used. For example, other primes above $2^{128}$ may be used.

Further, although the above uses the little-endian convention, it will be understood that a different convention could be used instead. For example, the big-endian convention could be used instead. In the big-endian system, the most-significant byte is stored at the smallest memory address, while the least-significant byte is stored at the largest memory address.

Returning to the authentication system 10 for quantum communication between two users Alice 100 and Bob 200 of FIG. 2, an example of a MAC scheme that can offer ITS security is described next. The MAC scheme is used to authenticate the key distribution. The scheme uses 'delayed authentication'. All the communication during a key distribution session is buffered, and once complete, a MAC tag is computed to verify the data. After the data verified, the data can then be processed or used. The entire communication, which may comprise large data volumes, is buffered before authentication.

Returning to the authentication system 10 for quantum communication between two users Alice 100 and Bob 200 of FIG. 2, an embodiment of a MAC scheme that offers ITS security is described next. The MAC scheme is for QKD authentication. The MAC scheme comprises the one-time pad (OTP) cipher in combination with the Poly1305 hash function described above. The MAC scheme is referred to as Poly1305-OTP.

The OTP is an encryption technique where a random secret key is combined with a plaintext message. The random secret key is at least as long as the plaintext message. The combination comprises using modular addition to combine each bit of the plaintext message with a corresponding bit of the key. The ciphertext may not be decrypted when the key is random, the key is at least as long as the plaintext, the key is never reused (in whole or in part), and the key is secret.

The OTP offers ITS-level security. The Poly1305-OTP scheme also provides ITS level security. Therefore, the QKD protocol can be ITS authenticated, enabling a complete ITS system.

The Poly1305-OTP provides the security of the OTP cipher together with the advantages of the Poly1305 hash function. In more detail:

Poly1305 uses arithmetic in a prime field which can be implemented very efficiently in software, using only addition, multiplication and modulus operations.

Software implementations of Poly1305 can execute in constant time (i.e. execution time independent of inputs) which avoids side-channel timing attacks (which is an improvement over software AES implementations).

Poly1305 is a flexible and space-efficient hash function, producing fixed 128-bit length tags from variable length message inputs Poly1305 can be computed on-the-fly for large messages that arrive over a long time period, with the interim value stored in an accumulator. This means each message chunk can be processed as it arrives and one does not need to cache whole messages before computing the hash (which means that unlike the example with delayed authentication, the Poly1305-OTP scheme has little impact on the performance of the QKD process)

The Poly1305-OTP is defined as:

$$(((c_1 r^q + c_2 r^{q-1} + \ldots + c_q r^1) \bmod 2^{130}-5) + s) \bmod 2^{128} \quad (7)$$

In Equation (7), $c_1, c_2, \ldots c_q$, are as defined above and relate to chunks of the message. $r^q, r^{q-1}, r^1$ are as defined above and r represents the hash key.

How the Poly1305 can be computed on-the-fly for large messages is described next. An accumulator A is set to 0. For each chunk, c of the message M, the accumulator A is set to $A \leftarrow A+c$, and then the accumulator is set to $A \leftarrow r \times A$. The accumulator A is periodically reduced modulo $2^{130}-5$ to something small enough (not necessarily to the smallest remainder) to continue the computation. After all the chunks c are processed, the accumulator A is fully reduced modulo $2^{130}-5$. Thus, the hash code for the complete message M (as shown in Equation (6)) is obtained by processing and accumulating chunks, c, of the message at a time. In other words, the computation involves an accumulator which gets updated with each block (chunk) of the message.

Updating the accumulator comprises the following. Each block of the message is processed by adding the block to the accumulator ($A \leftarrow A+c$). The accumulated value is then multiplied by the key ($A \leftarrow r \times A$).

After every update, an interim result is present in the accumulator. After all the blocks have been processed and the accumulator is fully reduced modulo $2^{130}-5$, the accumulator contains the hash code (as shown in Equation (6)).

An accumulator is a variable in a piece of code that uses a sum or product of a series of values. On every iteration of a loop, an addition and/or multiplication is performed and the result stored in the accumulator. In the above, the accumulator, A, is successively updated by $A \leftarrow A+c$ and then $A \leftarrow r \times A$, until all blocks of the message have been processed.

Additionally and optionally, the Poly1305-OTP is implemented by reserving a small proportion of the keys generated as part of the QKD protocol to use for MACs. In QKD systems, symmetric shared keys are continually generated and shared between the users Alice and Bob. The Poly1305-OTP uses a fresh (i.e. not previously used) key for each authentication tag. The symmetric shared keys from the QKD system is used for the cipher key, s, or for both the cipher key, s, and the hash key, r. The length of each message to be authenticated is variable and can be chosen in advance by the two users depending on their requirements. Since the Poly1305 hash function is efficient at compressing variable length messages to short 128-bit tags, the amount of key required for MACs is typically significantly less than the quantity of keys generated from the QKD process that uses those authenticated messages.

Note that in classical cryptosystems, the OTP algorithms may be viewed as problematic. This is because classical cryptosystems may have finite amounts of symmetric shared keys. Algorithms such as AES are used in MAC schemes since AES effectively expands a short key into a longer key, permitting reuse of the shared secret key. This reduces the amount of key material used for authentication. Therefore, alternative algorithms such as AES have been used.

On the other hand, the disclosed MAC scheme disclosed herein provides an improvement to the security of the communication networks by leveraging the benefits of the OTP cipher, which provides ITS, together with the benefits of the Poly1306 hash algorithm described above. The effect of this combination is a more secure MAC scheme that is practical to implement and maintains the performance of the QKD system.

The security of the Poly1305-OTP authentication scheme is described next. The security is defined by considering the security parameter E (which is described previously). In the development of complete systems based on composable primitives such as authentication and QKD, the whole-system security parameter is effectively limited by the weakest E value of the components.

The security is described by considering an example.

For QKD, the security parameter is chosen to be $\epsilon < 10^{-10}$, for example. Practically, this corresponds to a key failure rate of less than once in 30,000 years. The exact value can be varied by choice of QKD protocol parameters (e.g. size of finite size blocks) but is out-of-scope for this discussion.

It is desired that the security parameter of the MAC has a negligible contribution to the final system global security parameter. For example, the security parameter of the MAC is $\epsilon \ll 10^{-10}$.

In the Poly1305-OTP scheme, the probability of an attacker successfully forging a valid message tag is:

$$\epsilon \leq 8m/2^{106} \qquad (8)$$

In equation (8), m is the number of 128-bit blocks of the longest permissible message (i.e. the maximum message length=128×m bits) for a single generated tag. The length of each tag is 128 bits.

In an embodiment of the Poly-OTP QKD authentication scheme, 1 MAC tag is sent every hour. This tag therefore provides authentication for the last 60 minutes of classical communication. The communication bit rate is assumed to be 10 Gb/s. The MAC security parameter is computed as follows:

The maximum message length is $60 \times 60 \times 10^{10}$ bits.

m is therefore $(60 \times 60 \times 10^{10})/128 \approx 2^{38}$.

The probability of an attacker successfully forging a tag to make a user Bob accept faked messages is in that 60 min period is:

$$\epsilon \leq 8m/2^{106} \approx 8 \times 2^{38}/2^{106} \approx 2^{-65} \approx 10^{-20}.$$

Therefore, even for a very long message, the Poly1305-OTP MAC scheme offers many orders of magnitude better security than the typical QKD security parameter. The Poly1305-OTP MAC is thus suitable for QKD authentication.

In the above example, a worst-case security scenario using very long messages ($60 \times 60 \times 10^{10}$ bits) is described. It will be understood that, alternatively, tags may equally be sent more frequently that once per hour. Yet alternatively, tags may be sent less frequently that once per hour.

Figure 3:
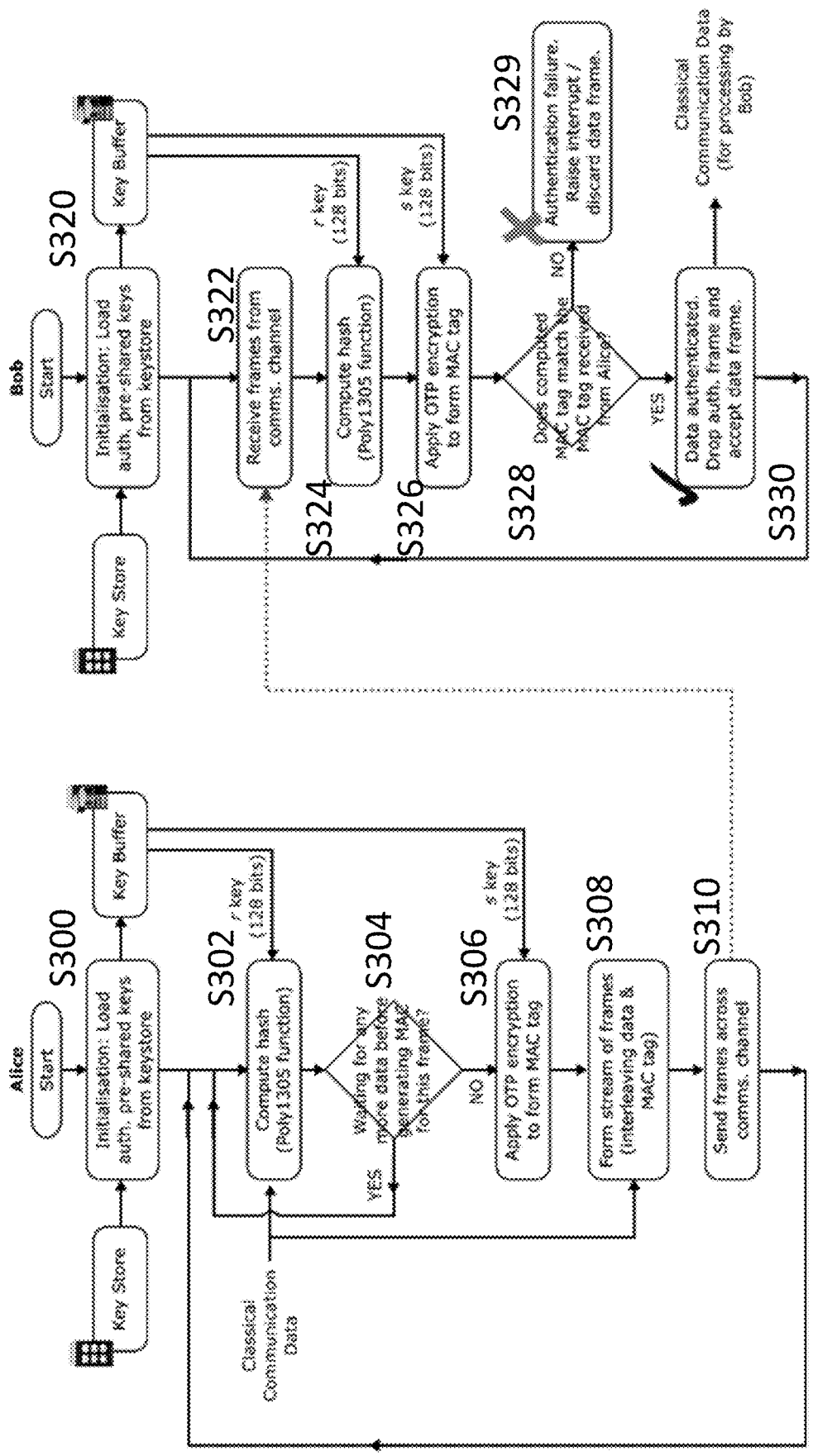
FIG. 3 shows a schematic illustration of an authentication method for quantum communication.

FIG. 3 shows a schematic illustration of an authentication method for quantum communication between two users Alice and Bob. In FIG. 3 the method is concerned with communication of classical messages from Alice to Bob. It will be understood that the same principle applies for messages sent from Bob to Alice. In addition, the method of FIG. 3 is applicable to simultaneous bi-directional communication between the two users.

The process starts in S300. In S300, Alice loads authentication key material for use. The key material is loaded from a key store. The key store stores indexed shared keys. The loaded key material is shared key material that is known to Bob. The shared key has been shared in advance (pre-shared) or, alternatively, the shared keys are generated during QKD operation. Such key material is taken from the QKD key management system (which may, or may not, be collocated with the QKD system control machine). The loaded key material is stored in a key buffer.

In step S302, Alice computes the Poly1305 hash for a classical message M that she wishes to send to Bob. The hash function is keyed by a 128-bit key hash key r. Hash key r is obtained from the key buffer. In other words, the hash code is computed for a message M and using a key r using the Poly1305 hash described herein.

The users Alice and Bob can choose (in advance) how often they want to authenticate messages. This can vary from real-time authentication of every data packet, to authentication of batches of data at intervals of seconds, minutes, hours or even longer where a single MAC tag is computed from a large message.

Optionally, as described herein, when the message M is large, the hash is computed from component parts (chunks c) of the message M as the chunks c arrive (that is, computed on-the-fly), the result is accumulated, and the resulting hash code corresponds to that obtained from Equation (6).

In step S304, it is checked whether any more data is expected. If more data is expected, the method returns to S302, where the hash function is computed (for the components as they arrive). If no further data is expected (that is, the entire message M has been obtained, and the final hash function computed), the method proceeds to step S306. Note that step S304 is optional and is applicable when the message M is obtained in chunks, c.

In step S306, the OTP encryption is applied to the hash code to form a MAC tag. The MAC tag is obtained following equation (7). OTP encryption uses a second key, s, which is obtained from the key buffer. The second key, s, also referred to as the cipher key, is a 128-bit key.

In step S308, the MAC tag obtained in S306 is packed in an authentication frame (described further below). The authentication frame is interleaved between data frames and, in step S310, the frames are sent across the communication channel to Bob. Note, that the communication channel is a classical channel in this case.

At step S308, the authentication engine at Alice loops back to S302 for computing a hash for the next classical communication data (another message, M) to be sent. Note that cipher key, s, is not re-used—every MAC tag is generated using a unique value of s.

Additionally and optionally, the hash key, r, is not re-used, and every hash code, and thus every MAC tag, is generated using a unique value of r. By not re-using the hash key, r, the security of the scheme is improved.

The steps S320 to S330 performed at the receiving end, Bob, is described next. Bob receives the frames sent by Alice across the communication channel. Bob verifies the authenticity of the received frames. The verification procedure is described below.

In S320, Bob initialises his key buffer with material from his key store, (including pre-shared keys with Alice). In other words, Bob loads authentication key material from a key store. The key store stores indexed shared keys. The loaded key material is shared key material that is known to Alice. The shared key has been shared in advance (pre-shared) or, alternatively, the shared keys are generated during QKD operation. Such key material is taken from the QKD key management system (which may, or may not, be collocated with the QKD system control machine). The loaded key material is stored in a key buffer.

In step S322, the Bob receives the frames sent by Alice across the communication channel. The frames are 'unpacked' and the received message and the received MAC tag are obtained. How the message and tag are obtained are described further below.

In S324, the Poly1305 hash function is applied to the received message to obtain a received hash code. The received hash function is computed using a hash key, r. The hash key, r, corresponds to the hash key used by Alice to generate the MAC tag for the received message. The hash key r is obtained from Bob's key buffer. The hash key is known to both Alice and Bob.

Optionally, which hash key is obtained from Bob's key buffer is determined using a first in first out (FIFO) system. A FIFO may be understood as a queue. Keys are pre-loaded into the queue so a new key can be pulled after each pre-set time interval. Alice and Bob already share a common clock for the QKD process, so this can be used to keep everything in sync. In other words, Alice and Bob are synchronised in time. Alternatively, a key index may be included along with each MAC tag message, indicating which key Alice/Bob should use when computing the MAC tag (Alice and Bob already share a database of indexed keys, in the form of their Key Management system).

In S326, the OTP cipher is applied to the received hash code to form a MAC tag derived from the received message. The OTP cipher uses a cipher key, s. The cipher key, s, corresponds to the cipher key used by Alice to generate the received MAC tag. The cipher key s is obtained from the Bob's key buffer. The cipher key is known to both Alice and Bob.

In S328, the MAC tag computed from the received message is compared to the MAC tag transmitted by Alice to Bob for the same data. If the tags match, the message is authenticated and the method proceeds to step S330. If the tags do not match, the authentication fails and the method proceeds to S329.

In S329, the authentication fails and an interrupt is raised so the user/QKD software can handle the failed authentication. Handling the failed authentication comprises at least one of the following: discarding the unauthenticated data; warning the user; requesting Alice to re-send the data in case the data got corrupted during transit In S330, the message is authenticated. Bob can discard the authentication frame and proceed to process the data. Bob may consider that the data came from Alice without being tampered with. After step S330, the method returns to S322 where Bob awaits the receipt of further frames from Alice.

Although this is not shown in the figure, note that, optionally, the received plaintext message is hashed from component parts (chunks c) of the message as the chunks c arrive (that is, computed on-the-fly). In other words, step S324 is implemented similar to S302 and S304.

Figure 4:
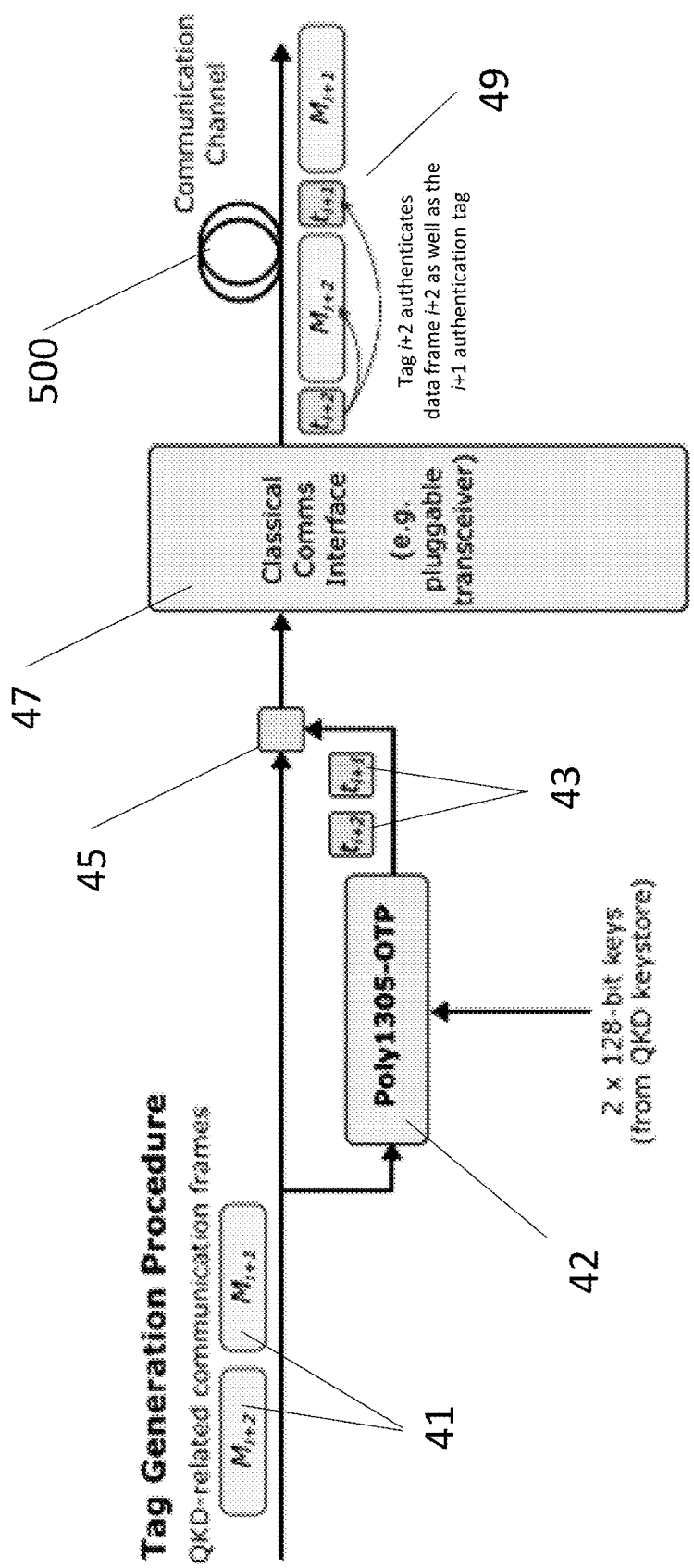
FIG. 4 shows a schematic illustration of a Message Authentication Code (MAC) tag generation procedure.

FIG. 4 shows a schematic illustration of the MAC tag generation procedure. Referring to FIG. 3, tag generation is performed at Alice. In an alternative which is not shown, tag generation is performed at Bob instead. In yet another alternative, tag generation is performed at both Alice and Bob.

The procedure starts with QKD related communication frames 41. A QKD related communication frame is a frame that comprises data associated with a QKD protocol (e.g. sifting data, error correction information, or privacy amplification information). The QKD related communication frame may also comprise hardware control data (e.g. timing data, stabilisation data, system start-up & hardware initialisation data, or key management information).

The QKD related communication may also be referred to as a data frame. The data in the data frame is the message that is authenticated. Although frames 41 here refer to QKD related data, the MAC tag generation procedure may also be applied to any other data.

As shown in FIG. 4, two QKD-related frames, referred to as data frames, are provided. The first data frame is referred to as $M_{i+1}$, and the second data frame is denoted $M_{i+2}$. The data frames are temporally separated, that is the second data frame is provided at a different time window from the first data frame.

Both data frames are fed into a Poly1305-OTP authentication engine 42 that generates a MAC tag 43 for each frame. The authentication engine 42 is configured to implement the method described in relation to FIG. 3. In particular, the authentication engine 42 is configured to perform steps S302 to S306 of FIG. 3. The authentication engine 42 uses two 128 bit keys from the QKD key score (as described relation to FIG. 3) to generate a first tag $t_{i+1}$ (derived from the $M_{i+1}$), and a second tag $t_{i+2}$ (derived from the $M_{i+2}$).

The data frames 41 and the tags 43 are then combined and/or interleaved together in a combiner 45. For example, the data frames 41 and tags 43 are arranged in the following sequence $\{M_{i+1}, M_{i+1}, M_{i+2}, t_{i+2}\}$. The interleaved data frames 41 and tags 43 form the data stream that is transmitted from Alice to Bob.

The interleaved data frames 41 and tags 43 are then fed into a classical communications interface 47. The classical communications interface 47 is configured to convert the data stream into an optical signal suitable for transmission over a communication channel 500. For example, the communications interface 47 is a pluggable transceiver. A pluggable transceiver is modular hardware comprising an optical transmitter and/or receiver configured for transmitting and/or receiving a signal over an optical fibre communication channel 500.

An optical signal 49, comprising the data stream that contains the sequence $\{M_{i+1}, t_{i+1}, M_{i+2}, t_{i+2}\}$, is then transmitted via communication channel 500.

As show in FIG. 4, the $t_{i+2}$ tag is used to authenticate the i+2 data frame ($M_{i+2}$) and the 1+1 tag ($t_{i+1}$). This ensures that the entire data stream can be authenticated, including the MAC tags themselves.

Note that, alternatively, the $t_{i+2}$ tag is used to authenticate the i+2 data frame ($M_{i+2}$) only.

Note that in FIG. 4, the combiner 45 is implemented in software and/or hardware. When implemented in software, a processor is configured to implement this components. When implemented in hardware, electronic circuitry is adapted to implement this component. Alternatively, an implementation may use both hardware and software.

The Poly1305-OTP engine is implemented as described below.

Figure 5:
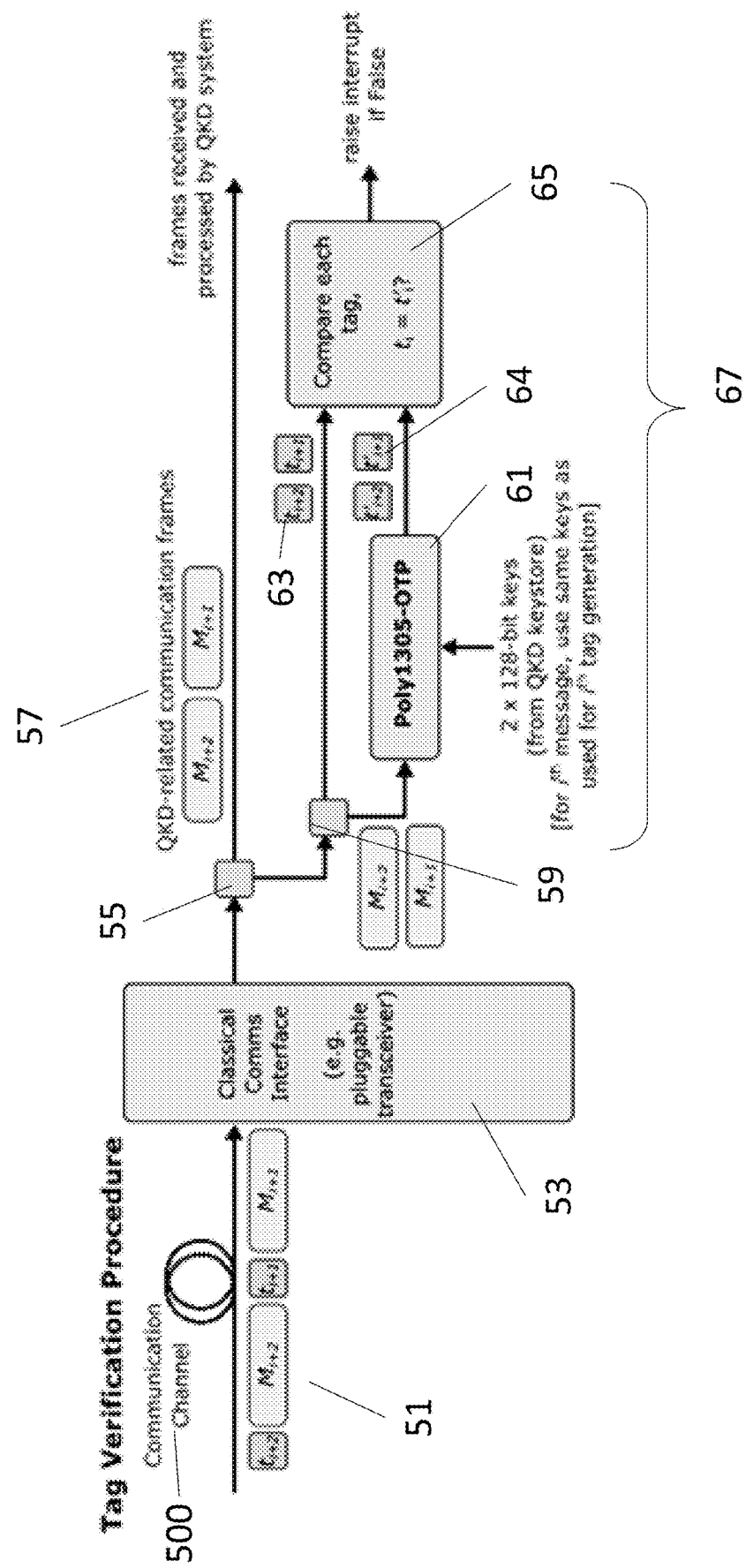
FIG. 5 shows a schematic illustration of a MAC tag verification procedure.

FIG. 5 shows a schematic illustration of the MAC tag verification procedure. Referring to FIG. 3, tag verification is performed at Bob. In an alternative which is not shown, tag verification is performed at Alice instead. In yet another alternative, tag verification is performed at both Alice and Bob.

Optical signal 51 is received from the other user via communication channel 500. The optical signal 51 may correspond to the optical signal 49 transmitted by the other user in FIG. 3. However, as will be described below, the received optical signal 51 may differ from the transmitted optical signal 49. The difference may be due to an attack, or due to errors introduced by the communication channel 500.

The received optical signal 51 is directed into a classical communications interface 53 that is configured to convert the optical signal into a data stream. For example, the communications interface 53 is a pluggable transceiver. A pluggable transceiver is a modular hardware comprising an optical transmitter and/or receiver configured for transmitting and/or receiving a signal over an optical fibre communication channel 500.

The received data stream is then directed to a separator 55. The separator 55 is configured to separate the data frames from the tag. In more detail, a copy of the QKD-related communication frames (the plaintext message), $M_{i+1}$ and $M_{i+2}$ are directed to a QKD system for processing. Another copy of the QKD related frames (plaintext message) $M_{i+1}$, $M_{i+2}$ together with the authentication tags $t_{i+1}$, $t_{i+2}$ are directed to an authentication engine 67 at Bob.

Note that, for example, the message frames and the tags may be separated by considering the header in the frame.

The authentication engine 67 of Bob is configured to implement methods steps S322 to S330 described in relation to FIG. 3.

At the authentication engine 67, the QKD related frames $M_{i+1}$, $M_{i+2}$ and the received tags 63 $t_{i+1}$, $t_{i+2}$ are separated at a further separator 59. The further separator 59 is configured to direct the received tags 63 $t_{i+1}$, $t_{i+2}$ to an input of a comparator 65, and to direct the received QKD related frames $M_{i+1}$, $M_{i+2}$ to a Poly1305-OTP engine 61 configured to calculate tags 64 ($t'_{i+1}$, $t'_{i+2}$) corresponding to the received frames ($M_{i+1}$, $M_{i+2}$).

In FIG. 5, the $t_{i+2}$ tag sent by Alice has been used to authenticate the i+2 data frame ($M_{i+2}$), and the $t_{i+1}$ tag has been used to authenticate the 1+1 data frame ($M_{i+1}$). The QKD related frames $M_{i+1}$, $M_{i+2}$ are directed to Poly1305-OTP engine 61 configured to calculate tags 64 ($t'_{i+1}$, $t'_{i+2}$) corresponding to the received frames ($M_{i+1}$, $M_{i+2}$). The calculated tags 64 ($t'_{i+1}$, $t'_{i+2}$) and the received tags 63 ($t_{i+1}$, $t_{i+2}$) are then compared at comparator 65. If the calculated tags 64 and received tags 63 do not match, authentication fails and an interrupt is raised (as described previously).

Note that in FIG. 5, the separator 55, the further separator 59, and the comparator 65 are implemented in either software or hardware. When implemented in software, a processor is configured to implement these components. When implemented in hardware, electronic circuitry is adapted to implement these components.

The Poly1305-OTP engine 61 is implemented as described below.

Figure 6:
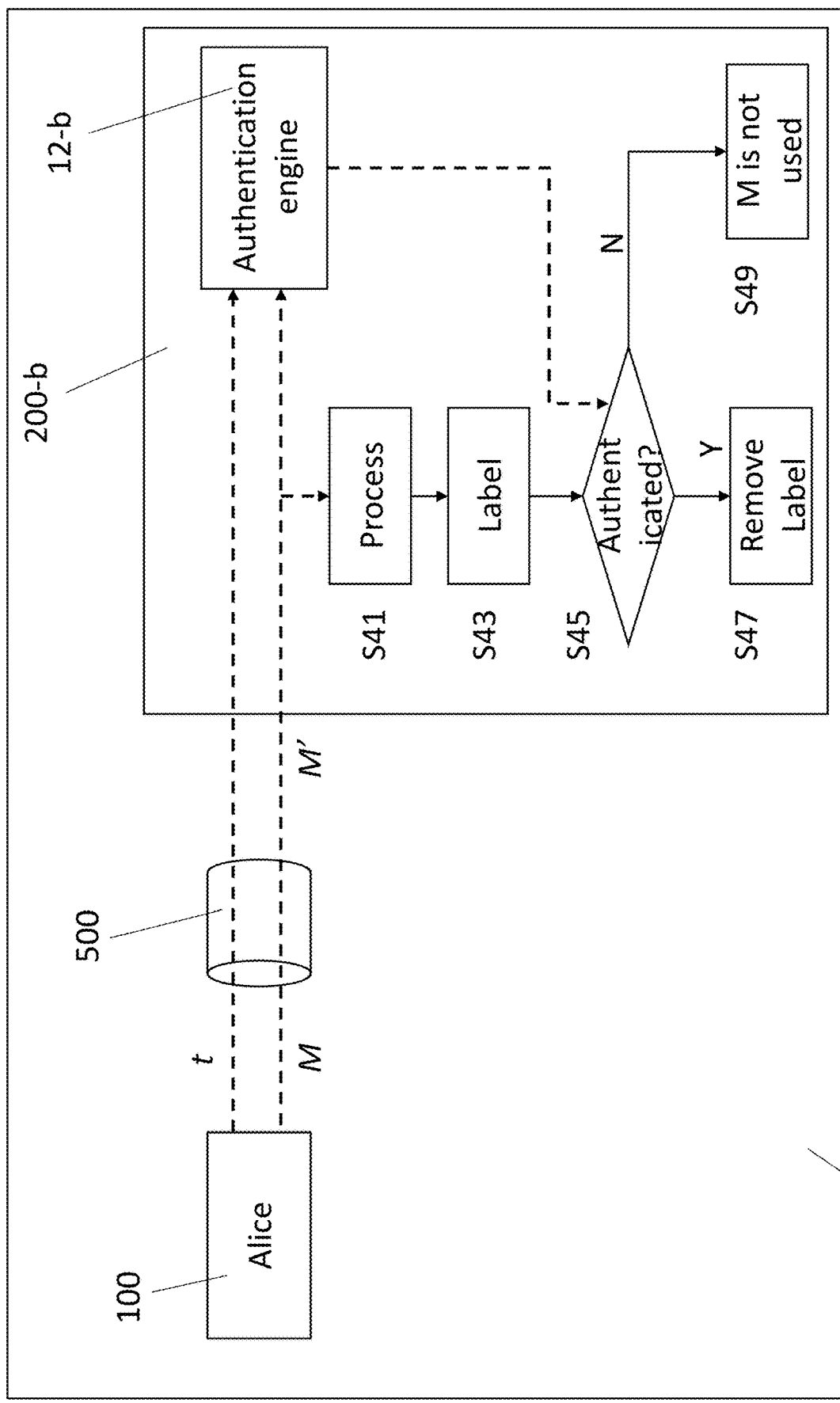
FIG. 6 shows a schematic illustration of an authentication system for quantum communication.

FIG. 6 shows a schematic illustration of an authentication system 10-b for quantum communication system.

Alice 100 generates a tag t using the Poly1305-OTP authentication engine 42 or engine 11 described herein. The tag, t, and message, M, is transmitted to Bob 200-b via communication channel 500.

At the receiving end, Bob 200-b, the received message M' is authenticated using the following procedure.

A copy of the received message and received tag is fed to an authentication engine 12-b. The authentication engine 12-b corresponds to engine 12 or engine 67 described herein.

In step S41, the received message M' is processed. Processed means that the message M' are computations that require M' are performed despite M' not yet having been authenticated.

In step S43, result of the process in S41 is labelled to indicate that this result has not yet been authenticated. For example, the result is labelled as "not yet authenticated".

At step S45, the result of the authentication engine 12-b is awaited.

The authentication engine 12-b implements the Poly1305-OTP scheme of engine 67 described previously in FIG. 5. Alternatively, the authentication engine 12-b corresponds to that of engine 12 shown in FIG. 2. In either case, authentication engine 12-b may use an accumulator to compute the hash on the fly, as described herein.

If the message is authenticated, the label is removed in step S47, and the result derived from processing the received message M' is treated as safe to use.

If the message is not authenticated, the label is not removed in step S49, and the result derived from processing the received message M' is treated as unsafe (i.e. not authenticated) to use. Optionally, in S49, the result is discarded. Alternatively, in S49, Alice is requested to resend the message.

Although FIG. 6 describes in S43 and S47 that the output of the processed message is labelled as "not yet authenticated", and said label is removed in S47 if authenticated, the following alternative scheme is equally possible: the output of the processed message is assumed to be unauthenticated (so S43 is omitted), and after authentication, at S47, a label is added to indicate that the result has been authenticated and is therefore 'safe' to use.

Thus, the purpose of S43 and S47 is to provide an indication that a result is authenticated or not. The indication may be provided by way of a label, as indicated above. Alternatively, the indication that a result is authenticated is provided by way of a flag, or by storing authenticated results in a predefined location. Yet, alternatively, the results from the process in S41, although already computed and stored, are not made accessible for use until they have been authenticated.

In other words, the received message M' is processed first, and then authenticated. Once the result of the processing is authenticated, an indication is provided to indicate that the result is authenticated.

For example, when the message M' relates to QKD protocol information, messages that have been tampered with can result in just the keys related to those messages being compromised. Those messages may nevertheless be processed in the meantime to obtain the related keys. However, the keys are only used once authenticated. Keys that have been tampered with are handled as described in relation to S49.

The advantage of the above method is that message M' can be processed as it arrives; there is no need to buffer the blocks of M' as they arrive. Thus, the method is more practical and performance of the QKD system is maintained. In other words, a performance penalty associated to buffering is reduced.

Thus, the authentication scheme enables variable length messages to be authenticated. The message length is not limited by any hardware buffer.

This enables performing authentication at arbitrary intervals. For example, authentication may be performed every few seconds, minutes, or even hours. This is because the scheme can process messages of varying size (since it is not limited by having to buffer/store the entire message M' and then processing it in one batch).

Furthermore, by performing authentications less frequently, less key material is required.

The above scheme enables users to choose at what time interval to authenticate.

Additionally and optionally, a header is included in the classical communications messages data, wherein the header indicates whether the message needs to be authenticated before being processed. That is, each message could have different authentication requirements defined. For example, hardware control messages comprise a header indicating that they should be authenticated before being processed. This is to avoid side-channel attacks. On the other hand, as described above, messages relating to QKD protocol information may be processed first, and then authenticated.

Figure 7:
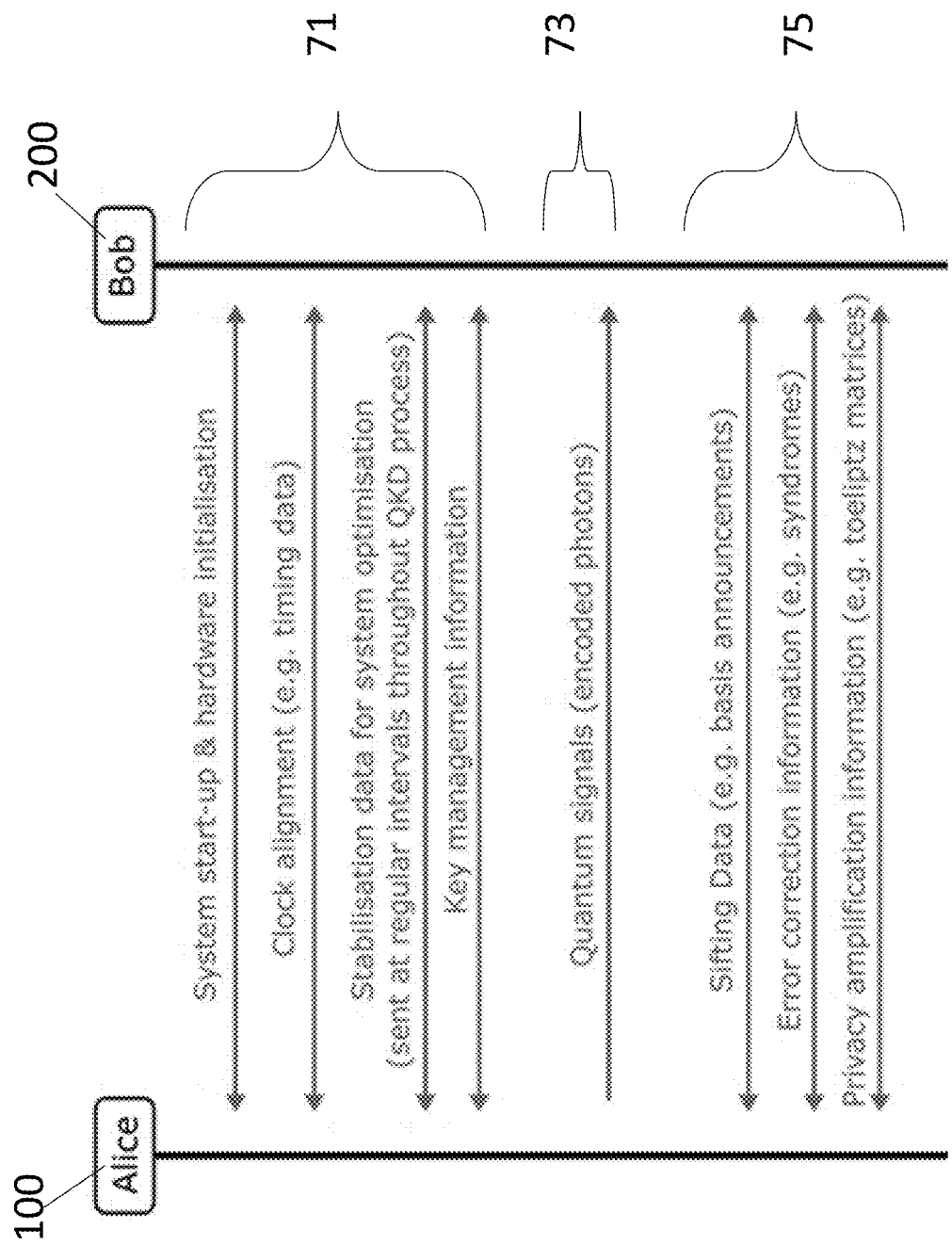
FIG. 7 shows a schematic illustration of the types of messages communicated between two nodes for the operation of a QKD system.

FIG. 7 shows a schematic illustration of the types of messages communicated between Alice 100 and Bob 200 for the operation of a QKD system.

The basic cryptographic primitive of QKD requires an authenticated classical channel for communications relating to the QKD protocol. In QKD, Alice encodes quantum signals onto photons 73 and transmits those photons to Bob. Quantum signals comprise information encoded as single quanta (such as single photons). Quantum signals 73 may be transmitted over a quantum channel. Quantum signals and the quantum channel are described further in relation to FIGS. 10 and 11.

The attraction of QKD is that eavesdropping of the quantum signals may be detected. In order to do so, after Bob has measured the encoded quantum signals sent by Alice, Alice and Bob communicate the bases used to prepare/measure each qubit and discard bits where mismatched bases were chosen (known as sifting). The sifting data 75 is shared over a classical channel. The classical channel must be authenticated. Sifting is described further below in relation to FIGS. 10 and 11.

Additionally and optionally, Alice and Bob perform error correction and privacy amplification to distil a secure key from the sifted key. This involves the sharing of information 75 such as error syndromes and privacy amplification matrices over the authenticated classical channel.

The sifting data, error syndromes and privacy matrices are examples of data associated with the QKD protocol 75. These data are transmitted over the authenticated classical channel.

The authentication system disclosed herein can meet the requirement for an authenticated classical channel with ITS security using the Poly1305-OTP MAC tag for communicated messages containing this information. Note that while quantum signals are only sent in the Alice to Bob direction, classical communication is two-way. Thus, both Alice and Bob perform tag generation/verification stages, depending on which direction each classical message is travelling.

In practical QKD systems, however, additional classical communication 71 is required to synchronise and control the hardware in Alice and Bob. The additional classical communication data 71 may be referred to as hardware control data 71. This includes, for example, messages when one of the users starts/stops QKD, and timing information to ensure Alice and Bob are synchronised in terms of bit number. Such communication is outside the scope of the QKD primitive and thus, not required to be authenticated to satisfy QKD security proofs.

However, optionally, the hardware control data 71 is also authenticated. Authenticating the control data 71 means that a MAC tag is also derived for the control data 71. The MAC is used to authenticate the message (the control data 71) as described herein. Authenticating the control data 71 protects the QKD against side-channel attacks and hardens the system. Side channel attacks are attacks that an eavesdropper could execute if they are able to trick one of the users into adjusting their hardware (for example, timing attacks). Such an attack is a threat against the implementation of the QKD protocol, not the protocol itself (i.e. a potential attack despite the protocol having ITS security). Therefore, in this option, all classical traffic between the QKD systems is authenticated.

Yet additionally and optionally, the Poly1305-OTP authentication scheme described herein is used to authenticate messages sent by applications using the QKD system. Such messages are not QKD-related messages but other information that an application at user Alice transmits to user Bob. For example, this may be an additional feature for customers using the system or for authentication of service channel messages between classical network infrastructure (e.g. the encryptor service channel or any other network services).

Figure 8:
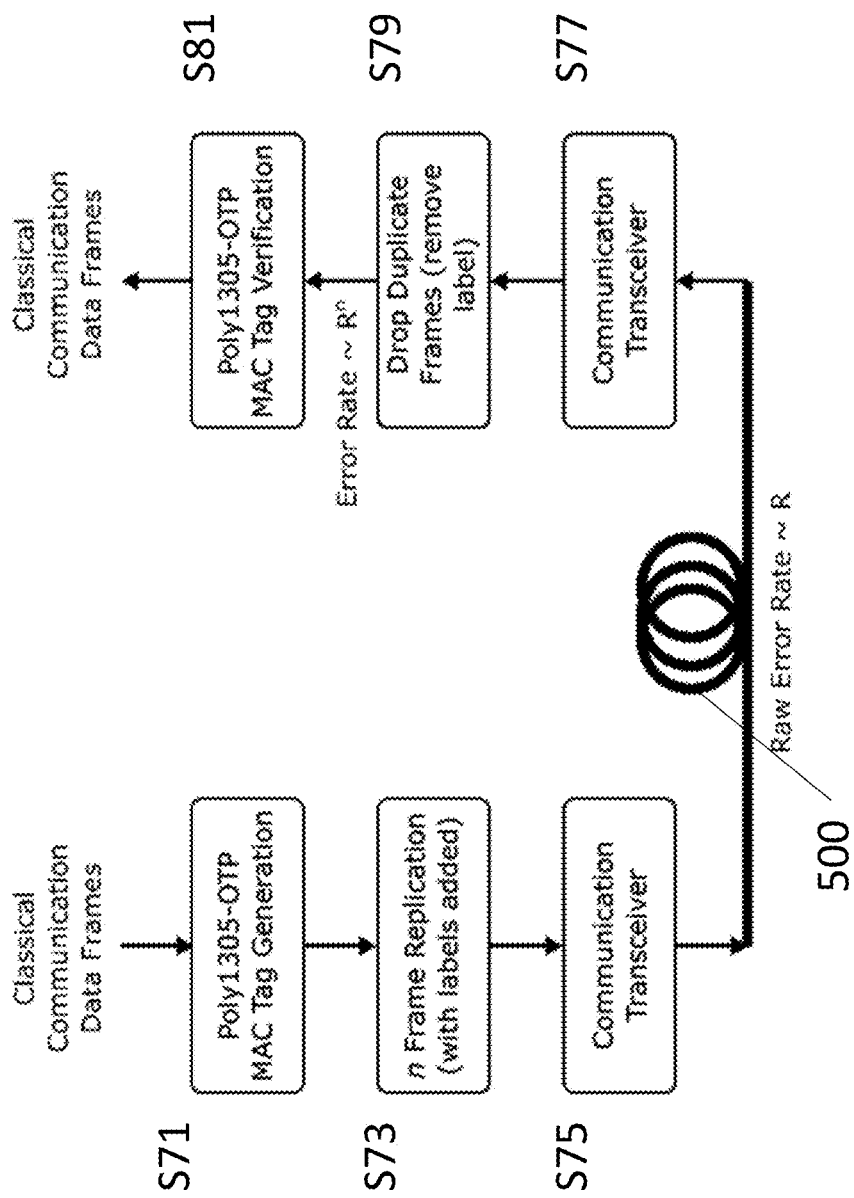
FIG. 8 shows a schematic illustration of an authentication method for quantum communication that uses replicated transmission.

FIG. 8 shows a schematic illustration of an authentication method for quantum communication that uses replicated transmission.

Communication channels may exhibit propagation loss, which results in the gradual attenuation of optical signals as they travel from Alice to Bob. An array of other phenomena, such as dispersion and nonlinearity, can also distort optical signals, leading to degradation of the signal to noise ratio. This results in errors when measuring the signals at the receiver, contributing to the bit error rate (BER). Longer distance signal propagation typically results in higher error rates and greater likelihood of bit errors.

This is particularly problematic for authentication, since a single bit error in the received messages/tag that results in it no longer matching the tag computed by Bob can result in authentication failure. As a result, the whole message M corresponding to that authentication tag t is discarded for safety, even if the origin of the tag mismatch is an honest error rather than malicious tampering. Such data loss can cause problems for QKD operation (particularly if a single MAC tag is used to authenticate a large volume of data). In an example, acknowledgements or requests to re-send data are used when errors occur.

In the authentication method of FIG. 8, replicated transmissions are used to overcome errors due to the communication channel.

The sender, Alice, duplicates all classical communication data & authentication frames she sends to provide redundancy so that the $2^{nd}$ copy can be checked if the authentication fails on the first attempt. For high-loss links, the replication factor, n, could be larger than 2 to provide more redundancy against problems caused by bit errors.

In more detail, in S71, the authentication engine at Alice performs the Poly1305-OTP MAC tag generation procedure described herein. The data frames, interleaved with the tags, are then replicated n times in S73. For example, n=2 (corresponding to a duplication). In S73, labels are also added to the frames to indicate which frames are replications.

In S75, the data stream comprising the replicated frames is directed to a communication transceiver configured to convert the data stream to an optical signal for transmission over the channel 500. The communication transceiver is a physical-layer transceiver (e.g. electrical-to-optical transponder).

At the receiving end, in S77, the received optical signal is converted to a data stream via a communication transceiver, which is a physical-layer transceiver (e.g. optical-to-electrical transponder).

In S79, the frames are checked for errors (e.g. if an error checking code is implemented, or simply by comparing multiple copies of the frames together) and duplicates are dropped. The labels indicating whether the frame was a duplicate or not are also removed.

In S81, the remaining frames are passed to the authentication engine at Bob to perform the Poly1305-OTP tag verification procedure.

Alternatively, at the receiving end, the frames are not dropped until after one of them has been verified. From S77, the Poly1305-OTP tag verification procedure is performed for all frames and error checking is performed by seeing if the computed authentication tag matches the received tag (since the likelihood of bit errors affecting both the tag and original message in a way that preserves their correspondence is negligibly small).

The advantage of replicated transmission compared to an example that uses acknowledgements or requests to re-send data, is that it avoids introducing latency and processing delays due to multiple round trips of communication between Alice and Bob just to verify a single message. Thus, the QKD system performance (i.e. maximum achievable secure bit rate) is maintained.

The reduction of errors using replicated transmission is described next.

As an example, consider a communications link where the bit error probability is $10^{-3}$. Assume that a single bit error results in the tag becoming invalid. The probability of n bit errors, i.e. the probability of all replicated transmissions failing, is $$Pr(n \text{ bit errors}) = (10^{-3})^n$$

Thus, even using n=2, reduces the effective error rate from $10^{-3}$ to $10^{-6}$ a significant reduction and thus, increased robustness of the authenticated QKD system against noise. While the replicated transmission of data places higher bandwidth requirements on the classical communication channel, the required bandwidth for executing the QKD protocol is usually sufficiently low that such additional data copies are not a problem, particularly at long distances where QKD systems tend to require lower bandwidth communication.

Additionally and optionally, replicated transmission is applicable on top of other error correction schemes (e.g. forward error correction, FEC, schemes) that are often implemented in physical transceivers/communication interfaces, further improving the systems' robustness against errors.

FIG. 9A shows a schematic illustration of a frame structure for data and/or authentication frames. The frame structure comprises the data payload (which is the data that is being transmitted) as well as additional bytes of data. The additional bytes of data comprises information relating to a "Destination Address", a "Source Address", or "Type".

As shown in FIG. 9A, bytes 0 to 5 relate to a destination address (here this indicates Bob); bytes 6 to 11 relate to a source address (here this indicates Alice), and bytes 12 and 13 relate to a "type". The "type" indicates which protocol is encapsulated in the payload of the frame and is used at the receiving end to determine how the payload is processed. Bytes 14 and onwards relate to the data payload.

Additionally and optionally, the frame structure is an Ethernet frame.

FIG. 9B shows a schematic illustration of a frame structure for data and/or authentication frames comprising a custom label. The frame structure of FIG. 9B is similar to that of FIG. 9A except for the following: bytes 12 to 15 relate to a "Custom labelling"; bytes 16 and 17 relate to the "type"; and bytes 18 onwards relate to the data payload.

The "custom labelling" enables the QKD system to track which frames are replicas. The label can be added to the frame structure. For example, the custom labelling includes a counter to track which replica each frame represents (as shown in FIG. 9B). This effectively forms custom Ethernet frames for transmission across the communication channel. When the replicas are dropped at the other end, the custom labels are removed, returning the frame back to standard Ethernet format for subsequent processing.

Figure 10:
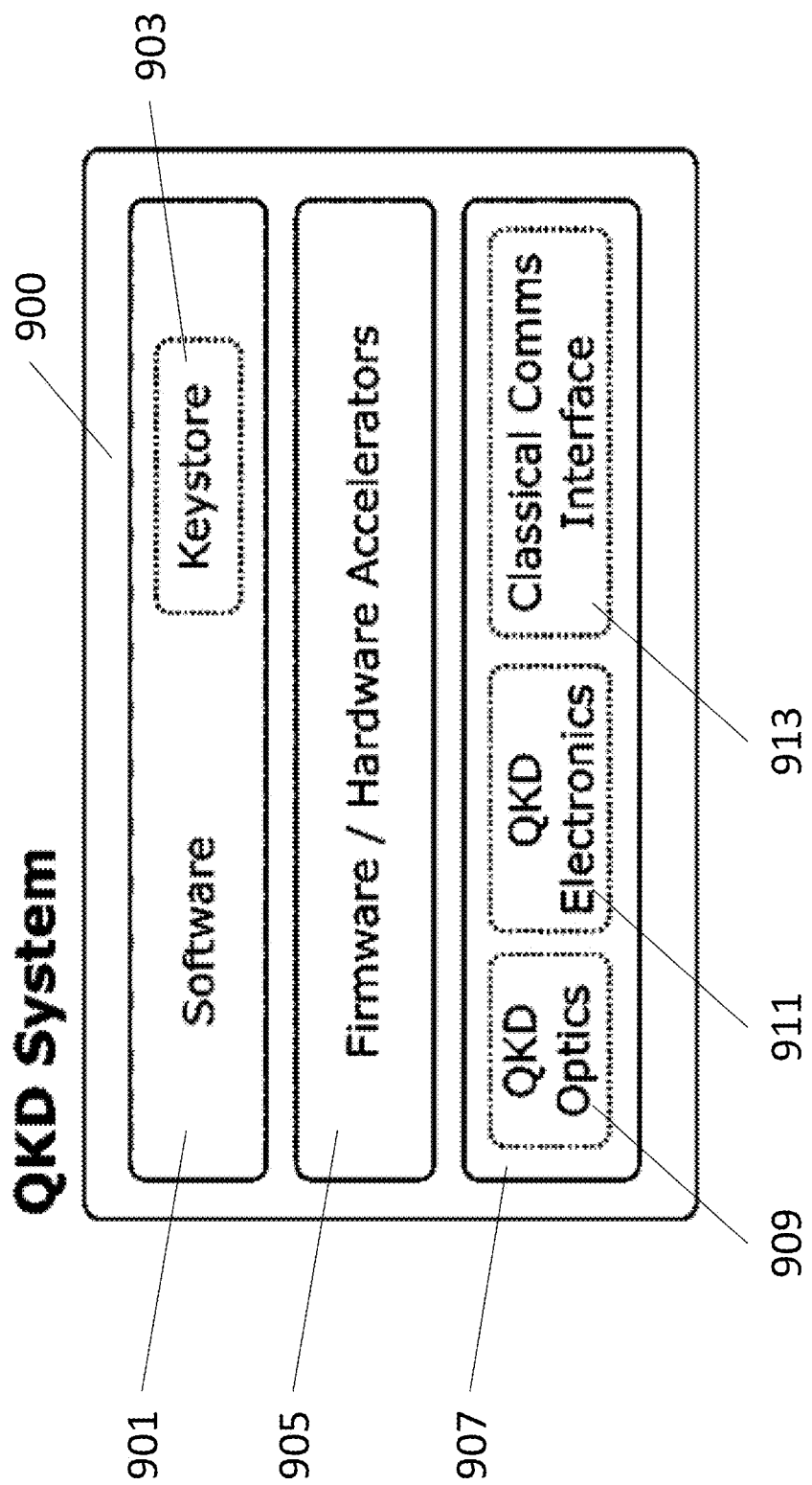
FIG. 10 shows a schematic illustration of the components of a node for quantum communication.

FIG. 10 shows a schematic illustration of the components of a node 900 for quantum communication. The components of the node 900 for quantum communication can be used to implement the authentication system 10.

The node 900 comprises a software layer 901. The software layer 901 comprises a key store 903. The key store 903 is configured to store key material that is used and/or generated in the QKD process. Optionally, a fraction of the key material is reserved for use by the authentication system 10.

The node 900 comprises a hardware layer 907. The hardware layer 907 comprises components for optics for QKD 909, electronics for QKD 911; and classical communications interface 913. The QKD optics and electronics are used by the QKD system for communication over a quantum channel and are described below. The Classical communication interface 913 is used by the QKD system (described further below) and also by the authentication system (as described above).

The node 900 comprises a firmware/hardware accelerator 905. Hardware accelerator implementations comprise application-specific integrated circuits (ASICs) or field-programmable gate array (FPGA) hardware. Additionally or alternatively, the firmware/hardware accelerator 905 comprises a processor such as a central processing unit (CPU), graphical processing unit (GPU). The firmware/hardware accelerator 905 is configured to implement the QKD protocol.

Additionally and optionally, the authentication system (i.e. the authentication engine) is implemented within the firmware/hardware accelerator 905 of the node 900 of the QKD system. Implementing the Poly1305-OTP authentication process on accelerated hardware (with keys provided by the software keystore) improves the performance and facilitates simple authentication of all communication. This is because the Poly1305-TP procedure can be applied as part of the pipeline when messages from software/other hardware are arranged into data frames for transmission across fibre by a transceiver (e.g. pluggable SFP or other electronic-to-optic converter).

Additionally or alternatively, received messages are processed and then authenticated as described in relation to FIG. 6. Received messages may be processed and the Poly1305-OTP authentication performed as the data becomes available. In other words, the authentication system is flexible and capable of verifying tags on the fly.

The authentication system and method disclosed herein enables the regularity of authentication tags to be set as a parameter. This makes for a flexible system where how often a MAC authentication is performed may be chosen according to the application. In particular, the authentication system and engine enables real-time authentication.

The authentication system and engine disclosed herein reduces the need for buffering large messages before they are authenticated and accepted for subsequent processing. Thus, compared to examples that implement authentication on hardware accelerators such as FPGAs, where the maximum message sizes are limited, and where delayed authentication is required, the disclosed system and method is more flexible.

Although the above describes that authentication engine implements the entire process at the hardware accelerator level, it will be understood that, alternatively or additionally, the Poly1305-OTP scheme is implemented in software. The software is executed by the processor which controls the QKD system or implements the QKD protocol.

In practice, during QKD system start-up, the remote nodes may need to communicate initialisation information in order to initialise their hardware. If this is the case, such initial communication would be unauthenticated if implemented only in hardware accelerators, since these have not been initialised.

Implementing the Poly1305-OTP authentication engine both in software and at the hardware accelerator level overcomes the problem of authentication on start-up. When the systems first start (and hardware accelerators are uninitialized), software-based Poly1305-OTP authentication is performed to protect the messages communicated between Alice and Bob that are used to initialise and synchronise their hardware. The keys for the authentication on start-up may be pre-shared in advance. After the hardware accelerators are initialised, the authentication engine switches to be performed on the hardware and not in software, giving improved performance and flexibility. Thus, the entire QKD operation is authenticated, right from the initialisation stage.

FIG. 1 to FIG. 10 described above relate to authentication systems and methods for quantum communication.

For completeness, a description of a quantum communication system (also referred to as a QKD system) that can be applied to any of the above embodiments follows below in FIG. 11.

Figure 11:
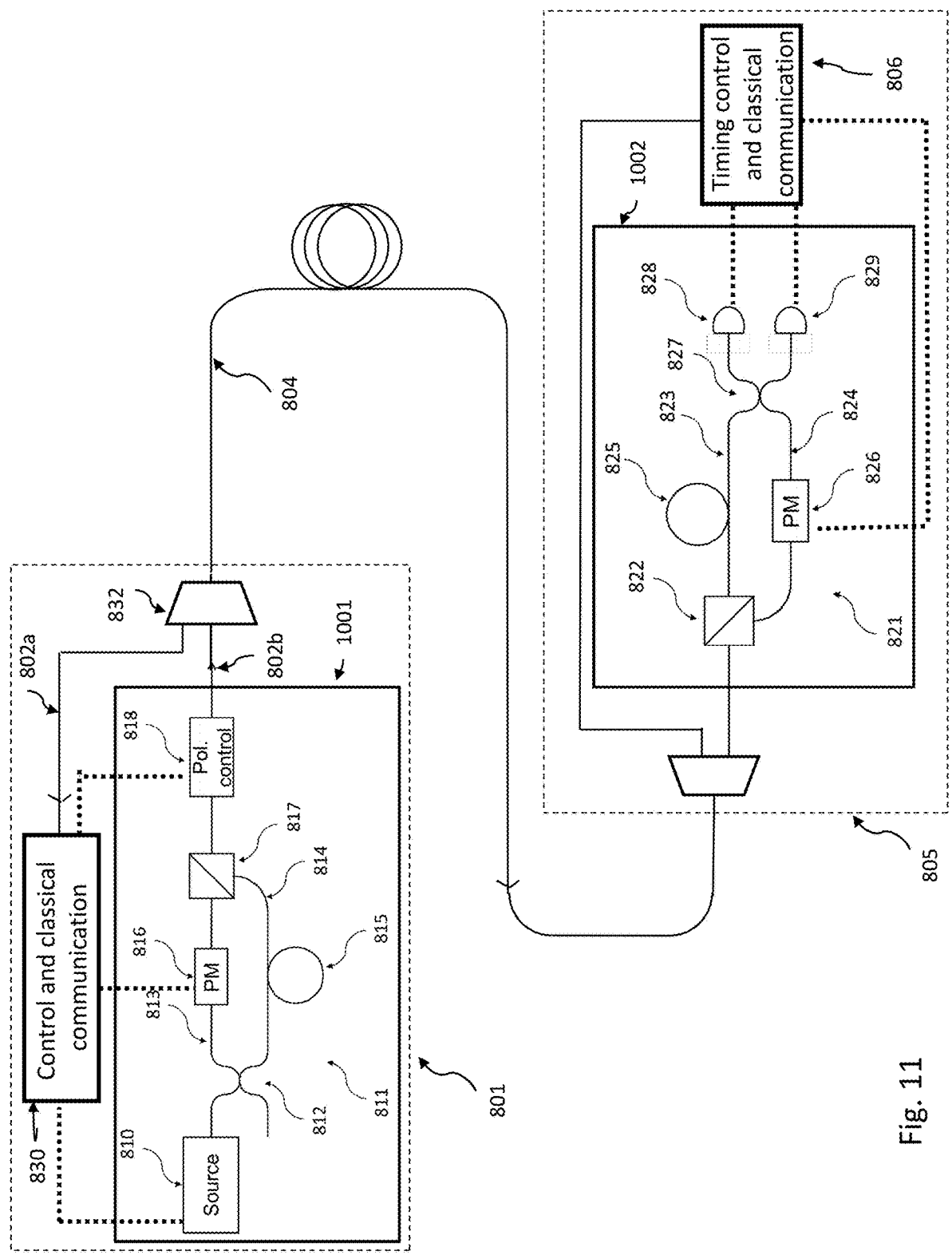
FIG. 11 shows a schematic illustration of a quantum communication system suitable for quantum communication between two nodes.

FIG. 11 is a schematic illustration of a quantum communication system suitable for quantum communication between two nodes.

In a quantum communication network, information sent between a quantum transmitter and a quantum receiver is encoded as single quanta, such as single photons. Each photon carries one bit of information encoded upon a property of the photon, such as its polarization, phase, or energy/time. The photon may carry more than one bit of information, for example, by using properties such as angular momentum.

In a quantum communication network in general, a quantum transmitter will be capable of encoding information on weak light pulses. A quantum receiver will be capable of decoding this information. Either discrete variable (DV) or continuous variable (CV) quantum information can be encoded. In DV QKD, weak coherent light pulses (WCP) can be generally thought of as light pulses that have a probability of containing less than one photon per pulse on average. During quantum encoding, the information is encoded on weak light pulses using polarisation, phase, and time-bin information etc. In CV QKD, each WCP pulse can contain up to 100 photons per pulse on average.

A DV QKD system consists of a QKD transmitter and a QKD receiver. The quantum transmitter transmits an encoded quantum signal pulses, each of which contains on average less than one photon per pulse. These optical signals are transmitted through a quantum channel before reaching the quantum receiver, which decodes the incoming signals and detects them using single photon detectors.

In a quantum communication network, such as the one illustrated in FIG. 11, communication between two nodes takes place through a quantum channel. The quantum channel may be implemented in an optical fibre connection. The quantum channel can be chosen to operate at any wavelength that is suitable for transmission over optical fibre channel which typically supports only one optical mode and is usually referred to as single mode fibre. For example, the quantum wavelength can be chosen at 1310 nm or at 1550 nm. When a quantum communication network is used to perform QKD, the quantum channel is also called a QKD link.

The embodiment described herein is not limited to information being encoded on weak light pulses using a particular degree of freedom such as polarization, phase and time-bin etc. In fact, encoding can be applied upon one of, or a mixture of, many different degrees of freedoms, such as phase, polarisation and time-bin etc.

In FIG. 11, the quantum transmitter 1001 and the quantum receiver 1002 are based on asymmetrical Mach-Zehnder interferometers (MZI). Transmitter unit 801 comprises quantum transmitter 901 and classical communication device 830. Receiver unit 805 comprises quantum receiver 1002 and classical communication device 806. Quantum transmitter 901 and quantum receiver 902 are connected through fibre 802b, wavelength division multiplexer 832, and fibre channel 804. Classical communication device 830 and classical communication device 806 are connected through fibre 802a, wavelength division multiplexer 832 and fibre 804. This is referred to as the classical channel Photon source 810 inside quantum transmitter 1001 generates a quantum signal, comprising pulses of light. The pulses are then encoded using the asymmetrical MZI 811. The pulses are directed into a beam splitter 812. One output of the beam splitter 812 is connected to a phase modulator 816. The output of the phase modulator 816 is connected to polarising beam splitter 817. This forms the short arm 813 of the interferometer. The other output of the beam splitter 812 is connected to a fibre loop 815, which is in turn connected to polarising beam splitter 817. This forms the long arm 814 of the interferometer. Light pulses travelling the long arm 814 are delayed with respect to light pulses travelling the short arm 813.

Quantum transmitter 1001 may also comprise an intensity modulator configured to vary the intensity of light pulses. The intensity modulator may be configured to realise a decoy-state QKD protocol, in which pulses of different intensities are sent which allows the sender and receiver to determine the presence of an eavesdropper by measuring the number of pulses which have been safely received with the different intensities. The transmitter may comprise more than one intensity modulator.

Phase modulator 816 is configured to apply a modulation to the phase of a light pulse travelling the short arm 813. A phase modulator can comprise a crystal waveguide, such as a LiNbO3 crystal waveguide, in which the refractive index is a function of electric field strength. Alternatively, the phase modulation can be provided by passive means, for example, a plurality of fixed phase elements which are each configured to apply a different fixed phase difference and a switch configured to select each of the said components.

The polarisation of a light pulse travelling from the short arm 813 of the interferometer is flipped by the polarizing beam splitter 817, from a first polarisation to a second polarisation, which is orthogonal to the first polarisation.

The quantum transmitter 1001 therefore generates coherent double pulses with a chosen phase difference and orthogonal polarization travelling down the fibre link 804. A polarisation controller 818 corrects any deviation of the polarisation of the pulses. Each quantum transmitter at each ONU may use a separate polarisation controller to align the polarisation of the pulses arriving at the receiver individually. The quantum transmitters may be pre-compensated. Alternatively, a single polarisation controller could be installed at the receiver side.

Quantum light pulses exit the quantum transmitter 1001 and are sent via fibre 802-1b to wavelength division multiplexer 832. The quantum signals are transmitted with a first wavelength. Wavelength division multiplexer 832 sends signals inputted from fibre 802-1b into fibre 804. The quantum signals are sent via fibre 804 to the quantum receiver 902.

In the quantum receiver 1002 the pulses are decoded using the asymmetrical MZI 821. The short arm 824 of the interferometer 821 comprises a phase modulator 826, such as has been described previously. The long arm 823 of the interferometer comprises a fibre loop 825, which exactly matches the fibre loop 815 in the transmitter. The long arm 823 and the short arm 824 are each connected to one of the outputs of the polarizing beam splitter 822 and to one of the inputs of beam splitter 827.

The polarizing beam splitter 822 sends a light pulse that enters with the second polarization down the long arm 823 of the interferometer and a light pulse that enters the polarizing beam splitter with the first polarization down the short arm 824. The polarization of a pulse travelling through the polarizing beam splitter 822 with the second polarisation is flipped to the first polarisation.

The outputs of beam splitter 827 are connected to photon detectors 828 and 829. Depending on the phase modulation applied at the transmitter 1001 and the receiver 1002, a signal will either be detected in photon detector 828 or in photon detector 829. Photon detectors 828 and 829 may be gated single-photon detectors which may be based on avalanche photo-diodes and specifically may be based on InGaAs avalanche photo-diodes. The detectors may be gated detectors such as self-differencing detectors. Self-differencing detectors perform time-filtering automatically. Time-filtering is possible due to the known arrival times of the quantum signals. The detector can be only activated during times photons are incident on the detector. Self-differencing may decrease the Raman noise by a factor of about 10.

Using phase modulator 816 and phase modulator 826 a QKD protocol such as BB84 can be realized.

In the BB84 protocol, Alice (operating on transmitter unit 801) selects a phase value at random from four equally spaced phase values. For example, Alice can randomly set the phase modulator 816 to one of four different values, corresponding to phase shifts of 0, $\pi/2$, $\pi$, and $3\pi/2$. 0 and $\pi$ are associated with bits 0 and 1 in a first encoding basis, while $\pi/2$ and $3\pi/2$ are associated with 0 and 1 in a second encoding basis.

Bob (operating on receiver unit 805) can randomly set the phase modulator 826 to one of two values, corresponding to a phase shift of 0 or $\pi/2$. This amounts to selecting between the first and second measurement bases, respectively. In other words, Alice's 0 and $\pi$ values are compatible with Bob's 0 value (first basis), and Alice's $\pi/2$ and $3\pi/2$ values are compatible with Bob's $\pi/2$ value (second basis).

A phase difference of 0 (i.e. the phase shift applied by Alice is 0 and the phase shift applied by Bob is 0 or the phase shift applied by Alice is $\pi/2$ and the phase shift applied by Bob is $\pi/2$), leads to a detection at detector 828. If, on the other hand, there is a phase difference of $\pi$ (i.e. the phase shift applied by Alice is $\pi$ and the phase shift applied by Bob is 0 or the phase shift applied by Alice is $3\pi/2$ and the phase shift applied by Bob is $\pi/2$) there will be a detection at detector 829. For any other value of difference between the phase modulation applied at the two phase modulators, there will be a finite probability that a photon may output at detector 828 or detector 829.

Neither Alice nor Bob knows what values the other chooses or will choose when choosing their values. Only afterwards do they compare whether they used the same basis, and then only use the values for the final key where they used the same basis. The results from any measurements performed using a different basis are discarded. This process is known as sifting. In this manner, Alice (source node) and Bob (destination node) have exchanged and have knowledge of a secret key.

The quantum signals with regular arrivals are detected by the detectors 828 and 829 in the quantum receiver 201. Following each detection event, the transmitter which sent the photon is identified from the arrival time of the photon. Then, the receiver 902 initiates the sifting process by communicating the time arrival and decoding basis with the identified transmitter, from the classical communication device 806 to classical communication device 830. Repeating this process for each detected photon, each one of the transmitters will form a sifted key sequence with the receiver 902 with lengths of, for example, at least a few thousands bits. Then, the transmitter and the receiver can start error correction and privacy amplification processes to distil a perfectly secret key between them. The classical communication device 806 may be responsible for classical communication between the transmitter and the receiver for error correction and privacy amplification.

In the above, phase modulator 816 and phase modulator 826 are used to realise a QKD protocol such as BB84. The phase modulators are randomly set. Although the above example related to the BB84 protocol, it will be understood that the authentication method disclosed herein could be applied to other QKD protocols. For example, the authentication method could be applied to twin field QKD (TF QKD) or measurement device independent QKD (MDI QKD) instead.

Random numbers can be produced from Random Number Generators (RNG). A random number is one that, when drawn from a set of possible values, has the same probability of being drawn as any other number from the set. For a sequence of random numbers, each number in the sequence is statistically independent of the other numbers in the sequence. In particular, Quantum Random Number Generators (QRNG) may be used. In QRNG, the source of randomness is physical and relies on the unpredictability of a measurement, and, in particular, the unpredictability relies on a quantum mechanical property. QRNGs can be implemented using gained-switched diode lasers. In gain-switched diode lasers, the lasing threshold is governed by spontaneous emission, which is a quantum mechanical process, such that the phase of the emitted pulse is random. By repeatedly switching the diode laser on and off, a stream of optical pulses, each having a random phase, can be generated. By measuring the random phase of each optical pulse in the stream of optical pulses, a sequence of random numbers can be obtained.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. An authentication method for quantum communication between two nodes, the method comprising:
    applying a hash function to a message to obtain a hash code;
    applying a one-time pad cipher to the hash code to obtain a message authentication code (MAC); and
    authenticating the message exchanged between the two nodes using the MAC,
    wherein the hash function is applied using a first key, the one-time pad cipher is applied using a second key, and each of the first key and the second key is a secret key that is shared between the two nodes.

2. The method according to claim 1, wherein the two nodes are connected via a quantum communication channel, wherein information is encoded on weak light pulses, wherein the two nodes are connected via a classical communication channel, and wherein the message is exchanged via the classical communication channel.

3. The method according to claim 1, wherein the hash function is applicable to a message of any length and wherein the hash function is configured to produce a fixed length hash code.

4. The method according to claim 1, wherein applying the hash function comprises:
processing each block of the message, wherein the message comprises a plurality of blocks;
accumulating the result of the processing for each block in an accumulator; and
deriving the hash code from the accumulator.

5. The method according to claim 1, wherein authenticating the message comprises:
transmitting an authentication frame interleaved with a data frame,
wherein the authentication frame comprises the MAC, and
wherein the data frame comprises the message.

6. The method according to claim 5, wherein authenticating the message further comprises:
transmitting a subsequent authentication frame interleaved with a subsequent data frame, the subsequent authentication frame comprising a subsequent MAC, wherein the subsequent MAC is used to authenticate the subsequent data frame and the authentication frame.

7. The method according to claim 5, wherein authenticating the message further comprises:
transmitting a replica of the authentication and data frame, wherein, responsive to the authentication and data frame failing authentication, the replica of the authentication and data frame is authenticated.

8. The method according to claim 7, wherein the replica of the authentication and data frames each comprise a label indicating that said frame is a replica.

9. The method according to claim 1, wherein the first key is unique.

10. The method according to claim 1, further comprising:
exchanging the first key and/or the second key using quantum key distribution.

11. A method for quantum communication between two nodes, the method comprising:
exchanging a quantum key distribution key on a quantum communication channel, wherein information exchanged on the quantum communication channel is encoded on weak light pulses;
exchanging a message on a classical communication channel; and
authenticating the exchanged message, wherein authenticating the exchanged message comprises:
applying a hash function to the message to obtain a hash code, wherein applying the hash function comprises:
processing each block of the message, wherein the message comprises a plurality of blocks, accumulating each processed block in an accumulator, and deriving the hash code from the accumulator;
applying a one-time pad cipher to the hash code to obtain a message authentication code (MAC); and
authenticating the message exchanged between the two nodes using the MAC,
wherein the hash function is applied using a first key, the one-time pad cipher is applied using a second key, and each of the first key and the second key is a secret key that is shared between the two nodes.

12. The method according to claim 11, further comprising:
deriving a result from the exchanged message;
authenticating the message according to the method of claim 11; and
responsive to the message being authenticated, indicating that the result is useable.

13. The method according to claim 12, wherein indicating that the result is authenticated comprises:
labelling the result as unauthenticated and then removing the label after authentication; or
labelling the result as authenticated after authentication.

14. The method according to claim 11, wherein the message comprises at least one of: quantum key distribution protocol information; a quantum key distribution hardware control signal; and an application message.

15. The method according to claim 11, wherein authenticating the exchanged message comprises:
transmitting the message and the obtained MAC;
determining a further MAC from the received message, wherein determining the further MAC comprises:
obtaining a further hash code by applying the hash function to the received message using the first key; and
applying a one-time pad cipher to the further hash code using the second key to obtain a further MAC; and
comparing the further MAC with the received MAC, such that the message is authenticated when the further MAC corresponds to the received MAC.

16. A quantum communication network for communication between two nodes comprising:
a quantum communication channel that connects the two nodes, wherein information is encoded on weak light pulses;
a classical communication channel that connect the two nodes; and
an authentication engine configured to authenticate the classical communication channel using the authentication method according to claim 1.

17. A node for quantum communication, the node comprising:
a quantum key distribution system; and
an authentication engine,
wherein the authentication engine is configured to perform the method according to claim 1.

18. A node for quantum communication, the node comprising:
a quantum key distribution system; and
an authentication engine,
wherein the authentication engine is configured to:
receive a message and a MAC;
determine a further MAC from the received message, wherein determining the further MAC comprises:
obtaining a further hash code by applying a hash function to the received message using a first key; and
applying a one-time pad cipher to the further hash code using a second key to obtain a further MAC; and compare the further MAC with the received MAC, such that the message is authenticated when the further MAC corresponds to the received MAC.

\* \* \* \* \*